US006630181B1

(12) United States Patent
Araba

(10) Patent No.: US 6,630,181 B1
(45) Date of Patent: Oct. 7, 2003

(54) METHOD OF REDUCING CHOLESTEROL AND ALTERING FATTY ACID CONTENT OF EGGS

(75) Inventor: Miloud Araba, Urbandale, IA (US)

(73) Assignee: DuPont Specialty Grains, Johnston, IA (US)

( * ) Notice: Subject to any disclaimer, the term of this patent is extended or adjusted under 35 U.S.C. 154(b) by 42 days.

(21) Appl. No.: 09/665,787

(22) Filed: Sep. 20, 2000

(51) Int. Cl.[7] ............................. A23L 1/32; A23K 1/18
(52) U.S. Cl. ........................................ 426/2; 426/614
(58) Field of Search ...................................... 426/614.2

(56) References Cited

U.S. PATENT DOCUMENTS

| | | |
|---|---|---|
| 4,128,640 A | 12/1978 | Klein |
| 4,197,293 A | 4/1980 | Klein |
| 4,197,294 A | 4/1980 | Klein |
| 4,764,531 A | 8/1988 | Nissen |
| 4,882,193 A | 11/1989 | Carrott |
| 5,012,761 A | 5/1991 | Oh |
| 5,091,195 A | 2/1992 | Havens |
| 5,246,717 A | 9/1993 | Garwin |
| 5,504,114 A | 4/1996 | Cook et al. |
| 5,520,938 A | 5/1996 | Brunnquell |
| 5,578,584 A | 11/1996 | Katta et al. |
| 5,665,375 A | 9/1997 | Meier et al. |
| 5,759,567 A | 6/1998 | Meier et al. |
| 5,759,600 A | 6/1998 | Brunnquell |
| 5,897,890 A | 4/1999 | Scheideler |
| 6,103,276 A | 8/2000 | Miner et al. |

FOREIGN PATENT DOCUMENTS

| | | |
|---|---|---|
| EP | 0 616 776 | 9/1994 |
| EP | 0 616 777 | 9/1994 |
| EP | 0 978 236 | 2/2000 |
| WO | WO 98/47389 | 10/1998 |
| WO | WO 99/52382 | 10/1999 |
| WO | WO 99/56565 | 11/1999 |

OTHER PUBLICATIONS

Watkins, et al., "Dietary modulation of oleic and stearic acids in egg yolks", 1992, *Journal of Food Composition and Analysis*, 3(3): 209–215.

Meluzzi, et al., "Lipid profile of eggs laid by hens fed on diets supplemented with different fats and oils", 1996, *Rivista di Avicoltura*, 65(1/2): 27–32.

Ding, et al., "Inclusion of coconut oil in diets for turkey breeders and its effects on embryonic yolk and liver fatty acids", *Poultry Science*, 76:1714–1721.

Cheshmedjieva, et al., "Studies on the lipogenesis in sexually immature and mature fowls", 1997, *Bulgarian Journal of Agricultural Science*, 3(1): 59–65.

Simenonvova, et al., "Nutritive value of eggs in low and high cholesterol groups of Japanese quail–fatty acids, fat- –soluble vitamins, amino acids", 1997, *Zivocisna Vyroba*, 42(4) 145–148.

Scheideler, et al., "Strain and age effects on egg composition from hens fed diets rich in n–3 fatty acids", 1998, *Poultry Science*, 77:192–196.

Latour, et al., "Broiler breeder age and dietary fat influence the yolk fatty acid profiles of fresh eggs and newly hatched chicks", 1998, *Poultry Science*, 77:47–53.

Sugiura, et al., "Use of high oleic corn in catfish feeds", 1996, *Journal of the World Aquaculture Society*, vol. 27, No. 1, p. 74–81 [see p. 79, second col., bottom].

Tinker, et al., "Modification of Plasma and Hepatic Lipids of Guinea Pigs by Feeding High Oleic Acid Port Compared with Regular Port", 1995, *Journal of Nutrition*, 122(9):1855–1861.

Dunlap, et al., "Fatty Acid Composition of Oil from Adapted, Elite Corn Breeding Materials", 1995, *Journal of American Oil Chemists Society*, 72(9):981–987.

Temme, et al., "Comparison of the effects of diets enriched in lauric, palmitic, or oleic acids on serum lipids and lipoproteins in healthy women and men", 1996, *American Journal of Clinical Nutrition*, 63:897–903.

Choudhury, et al., "Comparison of Plasma Lipids and Vitamin E in Young and Middle–Aged Subjects on Potato Crisps Fried in Palmolein and Highly Oleic Sunflower Oil", *Annals of Nutrition and Metabolism*, 1997, 41:137–148.

Truswell, et al., "Review Monounsaturated oils do not all have the same effect on plasma cholesterol", 9198, *European Journal of Clinical Nutrition*, 52:312:315.

Rebollo, et al., "Effects of consumipton of meat product rich in monounsaturated fatty acids (the hame from the Iberian pig) on plasma lipids", 1998, *Nutriiton Research*, vol. 18, No. 4, 743–750.

Wright, et al., "Influence of high oleic acid corn on broilers used in deep–fat frying: cooking fat comparisons", 1996, *Poultry Science*, 75 (Suppl):22 [abstract only].

Wright, et al., "Influence of high oleic acid corn on carcass cooking quality in broilers", 1996, *Poultry Science*, 75 (Supp 1):153 [abstract only].

Kotrola, et al., "Bacterial spoilage characteristics of thigh meat from broilers fed high fat–high oleic corn", 1995, *Poultry Science*, 74 (Supp. 1):198 [abstract only].

Ergul, et al., "The effect of high oleic acid corn in turkey diets: 2. Meat sensory evaluation and rancidity development in thigh and breast muscle", Poultry Science, 2000, 79 (Supp. 1):26 [abstract only].

Ergul, et al., "The effect of high oleic acid corn in turkey diets: 1. Turkey tom performance", 2000, *Poultry Science*, 79 (Supp. 1):30 [abstract only].

*Primary Examiner*—Anthony J. Weier
(74) *Attorney, Agent, or Firm*—Steven J. Callistein; Kathryn K. Loppegard; DuPont Specialty Grains

(57) ABSTRACT

The present invention provides a method of reducing cholesterol and/or altering fatty acid profiles in eggs and products derived from eggs. The method includes feeding to the animals a high oleic feed source and obtaining the eggs produced by the animals.

27 Claims, No Drawings

METHOD OF REDUCING CHOLESTEROL AND ALTERING FATTY ACID CONTENT OF EGGS

FIELD OF THE INVENTION

The present invention is directed to the field of animal nutrition. Specifically, the present invention relates to the use of high oleic feed sources to lower the cholesterol levels and/or alter the fatty acid content in eggs.

BACKGROUND OF THE INVENTION

As public awareness of the dangers of cholesterol has increased in recent years, a number of popular food products have drawn criticism for containing high levels of cholesterol. Eggs are among the maligned products that have suffered because of a public perception that eggs are unhealthy.

As a result of concern over cholesterol intake, a market has developed for egg products having reduced cholesterol. Many of these reduced cholesterol products are produced using additional processing steps after collection of the eggs, which add substantial cost to the production process. For example, U.S. Pat. No. 5,780,095 to Jackeschky, PCT application WO 99/56565 to Lederer, PCT application WO 94/05166 to Hsieh and European patent EP 0607120 to Oakenfull each describe these types of processes.

Also, as the consumer's knowledge of cholesterol has increased, most consumers have become aware of the difference between low density lipoproteins (LDL), often referred to as bad cholesterol, and high density lipoproteins (HDL), often referred to as good cholesterol. Thus, it would be beneficial to produce an egg with increased levels of HDL and decreased levels of LDL.

Attempts have also been made to reduce egg cholesterol by modifying the feed given to the egg-producing animals. For example, fibrous feed ingredients, such as barley, and feed additives, such as copper, iodine, wood shavings, human cholesterol reducing agents and other specialty chemicals have been utilized in an effort to reduce egg cholesterol. U.S. Pat. Nos. 5,665,375 to Meier, 5,246,717 to Garwin, 4,764,531 to Nissen and European Patent EP 0978236 each describe this type of approach. These types of feed and feed additives have proven disadvantageous for a number of reasons: they are typically expensive, increase feed costs, are not available in continuous supply, occupy valuable space during the feed mixing process, result in environmental contamination and/or have undesirable effects on the animal.

In addition to cholesterol, fatty acid composition of the diet is believed to have an impact on human health. Monounsaturated fatty acids, such as oleic acid, are believed to be nutritionally more favorable for the human diet. In addition, mono unsaturated fatty acids, such as oleic acid, are more stable against oxidation than some other fatty acids and thereby reduce the tendency of food products with a greater proportion of oleic fatty acids to become rancid or contain off flavors. Attempts have been made to feed poultry supplements high in oleic acid, such as olive oil, as described in Watkins, B. A. and Elkin, R. G., 1992, Dietary Modulation of Oleic and Stearic Acid in Egg Yolks, Journal of Food Composition and Analysis 3(3):209–215. However, this method has the disadvantage of producing poor quality feed pellets if the supplement is present above a certain level. Feed supplements such as high oleic sunflower seeds have been tried, but these have the disadvantage of containing such a high fiber content that only a limited amount can be included in the diet.

Thus, there remains a need in the art for a method of lowering the cholesterol levels and/or altering the fatty acid composition of animals and eggs without requiring substantial additional process steps, feed additives or non-optimum feed ingredients.

SUMMARY OF THE INVENTION

The present invention provides a method of reducing cholesterol and/or altering the fatty acid content in eggs. The method includes feeding the animals a high oleic feed source, and may be practiced individually or in combination with known methods of layer feeding and egg processing, including those involving a further reduction in cholesterol or alteration of fatty acids. As used herein, "feed source" refers to sources that provide a substantial portion of the nutritional and caloric requirements of the animal, rather than sources, such as mineral supplements, that provide limited nutritional and caloric value. For example, feed sources useful in the present invention include soybeans or cereal grains such as corn, sorghum, barley, rye, wheat, rice, millet, processed products derived from the above or mixtures thereof. As used herein, the term "total feed source" refers to the total amount of grain and soybeans used as a feed source and includes both high oleic grain and soybeans (the high oleic feed source) and any non-high oleic grain and soybeans used in the feed source.

Specifically, the method of reducing cholesterol and/or altering the fatty acid profile of the egg comprises providing a feed source comprising a high oleic feed source with at least 3.5% percent weight oleic acid when measured on a dry weight basis. The high oleic feed source is preferably high oleic corn, or more preferably high oleic high oil corn. After the feed source has been fed, the egg is collected. Any species of poultry may be used in this invention, although layer hens are preferred. Some non-exhaustive examples of poultry include laying hen or layer, turkey, emu, ostrich, duck, and goose.

The egg yolks produced by the above method have at least 5.0% less total cholesterol as compared to a normal egg yolk, preferably at least 7.8% less total cholesterol. Similarly, eggs produced by the above process have at least 3.1% less low density lipoprotein as compared to a normal egg, and preferably at least about 5.9% less low density lipoprotein. Further, eggs produced by the above process have at least 3.2% more high density lipoprotein as compared to a normal egg, and preferably at least about 8.7% more high density lipoprotein. A "normal egg" is defined as an egg produced by an animal fed conventional feed sources containing conventional amounts and forms of oil with conventional amounts of oleic acid.

DETAILED DESCRIPTION OF THE INVENTION

The present invention is directed to a method of reducing cholesterol in eggs and/or to a method of altering the fatty acid profile of eggs. The present invention is also directed to eggs and egg products containing reduced cholesterol and/or altered fatty acid profiles.

Regular corn typically contains about 2.5 to about 5.1 weight percent oil, based upon the total dry weight of regular corn. The oil content of high oil corn is typically at least greater than 5.1 weight percent and more preferably at least about 6.0 weight percent. Some high oil corn varieties have been developed with an oil content of about 12.0 weight percent, or more, based on the total dry matter weight of the high oil corn.

The oleic acid concentration in the oil of regular corn typically ranges from about 20 weight percent, to about 30 weight percent, based upon the total weight of the oil in the regular corn. The oleic acid concentration in the oil of high oleic corn is typically at least about 45 weight percent, more preferably at least about 60 weight percent, and even more preferably at least about 64 weight percent, based upon the total weight of the oil in the high oleic corn. Some high oleic varieties have been developed with an oleic content of about 75 weight percent, or more, based on the total weight of the oil in the high oleic corn, and these would be most preferable for use in the present invention.

Any variety of high oleic corn with sufficient oleic levels may be used in the present invention. An example of a high oleic corn variety is described in PCT application WO 92/01367 to Alexander. However, most preferable is the use of a variety that has the high oleic trait in combination with a high oil trait, as this variety will have the highest oleic levels when measured on an absolute basis. A variety with the high oleic trait in combination with a high oleic trait is described in PCT application WO95/22598 to Leto. High oleic high oil corn is available from DuPont Specialty Grains in Johnston Iowa. The corn used in the present invention is preferably ground and mixed into feed. The corn may be fed in mash, crumble or pellet form, and used with or without additional feed ingredients.

The oil of the high oleic high oil corn typically has the fatty acid composition set forth in Table 1. The oleic acid concentration in the oil of high oleic high oil corn is typically at least about 50 weight percent, more preferably at least about 60 weight percent, and most preferably at least about 64 weight percent, based upon the total weight of the oil in the high oleic high oil corn.

TABLE 1

| COMPONENT | TYPICAL WEIGHT PERCENT* IN OIL OF REGULAR CORN | TYPICAL WEIGHT PERCENT** IN OIL OF HIGH OLEIC HIGH OIL CORN |
| --- | --- | --- |
| Myristic (C14:0) | 0.0 | 0.0 |
| Myristoleic (C14:1) | 0.0 | 0.0 |
| Palmitic (C16:0) | 13.9 | 9.6 |
| Palmitoleic (C16:1) | 0.0 | 0.0 |
| Stearic Acid (C18:0) | 1.8 | 1.5 |
| Oleic Acid (C18:1) | 25.4 | 60.1 |
| Linoleic Acid (C18:2) | 57.7 | 27.6 |
| Linolenic Acid (C18:3) | 0.9 | 0.6 |
| Arachidic (C20:0) | 0.2 | 0.4 |
| Eicosenoic (C20:1) | 0.2 | 0.3 |

*based upon the total weight of the oil in the regular corn
**based upon the total weight of the oil in the high oil high oleic corn A soybean variety with higher oleic acid levels than commodity soybeans has also been developed and is available from DuPont Specialty Grains of Johnston, Iowa. This soybean typically contains about 83% oleic acid and 3% linoleic acid. This high oleic soybean is suitable for use in the present invention, either alone or in combination with high oleic corn.

Surprisingly, it has been discovered that the high oleic feed source, when fed to poultry, reduces cholesterol levels eggs produced by the poultry. It has also been discovered that the high oleic feed source, when fed to poultry, causes an increase of oleic acid, including a surprising increase in the cis-isomer form of oleic acid. As the cis double bond isomer is more flexible that the trans double bond isomer, this is an advantage of the present invention, since cis-isomer fatty acids are believed to have health advantages over trans-isomer fatty acids.

High oleic oilseed(s) and high oleic high oil grain(s) may be fed to poultry either separately or in any combination with each other. Additionally, high oleic soybeans and high oleic high oil corn may be combined with other components to form a feed composition that is fed to poultry. Some non-exhaustive examples of such feed components include water; beans, such as regular soybeans; grains, such as regular corn; plant-based oils; plant-based meals, such as soybean meal and/or corn meal; animal-based protein meals, such as meat-based meal and bone meal; fatty acids; commercially available formula feeds; vitamin and/or mineral supplements; and any mixture of any of these.

After the high oleic high oil grain is fed to the poultry, eggs produced by the bird may be collected and processed for later sales as egg products, such as whole eggs, pasteurized eggs, liquid whole egg, liquid yolk or any other further processed product.

EXAMPLE 1

Seven hundred and thirty pullets (approximately 17 weeks of age) of a commercial strain were obtained and fed under commercial conditions and commercial rations so as to acclimate to test facilities. These hens were fed a Preconditioner ration for seven days prior to start of the study. Layers were weighted on Trial day "−7", weights sorted in descending order and distributed into blocks by weight in order to be assured of approximate equal weights at housing. Each treatment group was fed to 90 laying hens randomly assigned to 15 replicates per treatment at the start of the study. Each replicate (cage) contained six hens. Hens were observed daily for signs of production and/or behavioral changes. Daily temperature was recorded, with a temperature goal of 75° F. Feed and water provided ad libitum. Individual free-standing cage (6 hens/cage; 46 in$^2$/hen) dimensions were 18" wide×26" long×18" high. Each cage row contained 4 cages×3 tiers high.

Test periods were: Preconditioning (Day −7 to 0); Layer 1 (Day 0–28); Layer 2 (Day 29–56) Layer 3 (Day 57–Day 84); Layer 4 (85–112); and Layer 5 (Day 113–140). The two corns utilized in the study were regular yellow dent corn (YDC; bin run) and high oleic high oil corn (HOHOC) with nutrient profiles provided in Table 2.

TABLE 2

Nutrient composition of yellow dent corn and high oleic high oil corn[A]

| | As Fed Basis | |
| --- | --- | --- |
| Nutrient | Yellow Dent Corn | High Oleic High Oil Corn |
| Dry Matter (%) | NA[1] | 87.3 |
| Crude Protein (%) | 7.90 | 8.30 |
| Estimated TMEn (kcal/lb) | 1577 | 1618 |
| Estimated MEn (kcal/lb) | 1545 | 1596 |
| Crude Fat (%) | 4.09 | 5.74 |
| Crude Fiber (%) | 2.32 | 2.4 |
| Total Phosphorus (%) | 0.30 | 0.24 |
| Available Phosphorus (%) | 0.10 | 0.087 |
| Calcium (%) | 0.005 | 0.020 |
| Essential Amino Acids: | | |
| Arginine (%) | 0.43 | 0.42 |
| Cystine (%) | 0.21 | 0.21 |
| Histidine (%) | 0.25 | 0.38 |
| Isoleucine (%) | 0.29 | 0.27 |
| Leucine (%) | 1.08 | 0.91 |

TABLE 2-continued

Nutrient composition of yellow dent corn and high oleic high oil corn[A]

As Fed Basis

| Nutrient | Yellow Dent Corn | High Oleic High Oil Corn |
|---|---|---|
| Lysine (%) | 0.24 | 0.29 |
| Methionine (%) | 0.21 | 0.21 |
| Phenylalanine (%) | 0.44 | 0.33 |
| PHE + Tyrosine (%) | 0.70 | NA[1] |
| Threonine (%) | 0.40 | 0.28 |
| Tryptophan (%) | 0.11 | 0.066 |
| Valine (%) | 0.43 | 0.39 |
| Fatty Acids (% of Total Fatty Acids): | | |
| Palmitic (%) | NA | 8.5 |
| Stearic (%) | NA | 2.2 |
| Oleic (%) | NA | 60.4 |
| Linoleic (%) | (2.536% of sample) | 26.8 |
| Arachidonic (%) | NA | 0.8 |
| Linolenic (%) | NA | 0.9 |

[A]Crop production year = 1995. Analyses based on one sample per corn.
[1]NA = Not available All mash diets were formulated to meet or exceed National Research Council (NRC, 1994) recommendations for nutrient requirements of laying hens. The regular corn diets were formulated to have 2 energy/nutrient density levels, while the high oleic high oil corn diets contained three energy/nutrient density levels. The energy/nutrient density designations were: low (LND), high (HND) and very high (VHD). Nutrients were adjusted in an effort to maintain equal nutrient:metabolizable energy ratios within all diets, regardless of dietary energy level. Low energy diets contained no added fat and utilized wheat midds in order to attain the desired energy/nutrient density level. Dietary nutrient requirements were adjusted for each phase of production. No medications were given during acclimation or test periods. Test diet composition for the various phases is provided in Tables 3–7.

TABLE 3a

Ingredient composition of test diets for Phase 1

| | Yellow Dent Corn | | High Oleic High Oil Corn | | |
|---|---|---|---|---|---|
| Ingredients | LND | HND | LND | HND | VHD |
| Yellow Dent Corn (%) | 68.04 | 63.97 | — | — | — |
| High Oleic HOC (%) | — | — | 66.29 | 66.87 | 63.97 |
| Soybean meal - 48 (%) | 16.19 | 19.31 | 15.61 | 18.07 | 19.01 |
| Wheat Midds (%) | 3.13 | — | 5.46 | — | — |
| An/Veg Fat (%) | — | 3.36 | — | 1.70 | 3.36 |
| Meat Blend 58% (%) | 3.00 | 3.00 | 3.00 | 3.00 | 3.00 |
| Dicalcium Phosphate (%) | 1.12 | 1.26 | 1.18 | 1.31 | 1.35 |
| Limestone (%) | 7.82 | 8.37 | 7.76 | 8.33 | 8.48 |
| DL-Methionine (%) | 0.12 | 0.14 | 0.12 | 0.13 | 0.14 |
| L-Lysine HCl (%) | 0.05 | 0.01 | 0.06 | 0.04 | 0.12 |
| Vitamin Premix (%) | | | 0.025% | | |
| Trace Mineral Mix (%) | | | 0.075% | | |
| Other[A] (%) | | | to 100% | | |
| Ration Cost/Ton of feed | $123.76 | $137.44 | $122.77 | $132.03 | $140.57 |

[A]Other = Choline chloride and salt added to help meet requirements for choline and sodium.

TABLE 3b

Calculated nutrient composition (As Is Basis) of test diets for Phase 1

| | Yellow Dent Corn | | High Oleic High Oil Corn | | |
|---|---|---|---|---|---|
| Nutrients | LND | HND | LND | HND | VHD |
| ME (kcal/lb) | 1270 | 1361 | 1270 | 1361 | 1386 |
| Crude Protein (%) | 15.00 [1.18][A] | 16.08 [1.18] | 15.00 [1.18] | 16.08 [1.18] | 16.37 [1.18] |
| Crude Fat (%) | 3.01 | 6.06 | 4.43 | 5.95 | 7.42 |
| Crude Fiber (%) | 2.37 | 2.14 | 2.54 | 2.23 | 2.18 |
| Calcium (%) | 3.45 [0.27] | 3.70 [0.27] | 3.45 [0.27] | 3.70 [0.27] | 3.77 [0.27] |
| Avail. Phosphorus (%) | 0.40 [0.031] | 0.43 [0.032] | 0.40 [0.031] | 0.43 [0.032] | 0.44 [0.032] |
| Total Phosphorus (%) | 0.61 | 0.65 | 0.57 | 0.62 | 0.62 |
| Sodium (%) | 0.17 [0.013] | 0.18 [0.013] | 0.17 [0.013] | 0.18 [0.013] | 0.19 [0.014] |
| Arginine (%) | 0.98 [0.077] | 1.08 [0.079] | 0.95 [0.075] | 1.04 [0.076] | 1.06 [0.076] |
| Lysine (%) | 0.77 [0.061] | 0.77 [0.057] | 0.77 [0.061] | 0.83 [0.061] | 0.91 [0.066] |
| Digestible Lysine (%) | 0.72 [0.057] | 0.82 [0.060] | 0.72 [0.057] | 0.77 [0.057] | 0.86 [0.062] |
| Methionine (%) | 0.39 [0.031] | 0.42 [0.031] | 0.39 [0.031] | 0.41 [0.030] | 0.42 [0.030] |
| MET + CYS (%) | 0.68 [0.054] | 0.72 [0.053] | 0.68 [0.054] | 0.72 [0.053] | 0.74 [0.053] |
| Digestible MET + CYS (%) | 0.61 [0.048] | 0.65 [0.048] | 0.61 [0.048] | 0.65 [0.048) | 0.67 [0.048] |
| Tryptophan (%) | 0.21 [0.017] | 0.23 [0.017] | 0.17 [0.013] | 0.19 [0.014] | 0.20 [0.014] |
| Choline (g/kg) | 1.08 [0.085] | 1.16 [0.085] | 1.08 [0.085] | 1.16 [0.085] | 1.18 [0.085] |

[A]Numbers in brackets represent nutrient as percentage of dietary ME. [ = (Nutrient/ME)*100].

TABLE 4a

Ingredient composition of test diets for Phase 2

| | Yellow Dent Corn | | High Oleic High Oil Corn | | |
|---|---|---|---|---|---|
| Ingredients | LND | HND | LND | HND | VHD |
| Yellow Dent Corn (%) | 69.70 | 68.28 | — | — | — |
| High Oleic HOC (%) | — | — | 67.91 | 71.25 | 68.28 |
| Soybean meal - 48 (%) | 13.71 | 16.29 | 13.12 | 15.00 | 15.49 |
| Wheat Midds (%) | 4.27 | — | 6.64 | — | 0.75 |
| An/Veg Fat (%) | — | 2.46 | — | 0.74 | 2.46 |
| Meat Blend 58% (%) | 3.00 | 3.00 | 3.00 | 3.00 | 3.00 |
| Dicalcium Phosphate (%) | 1.14 | 1.28 | 1.21 | 1.33 | 1.34 |
| Limestone (%) | 7.48 | 7.96 | 7.43 | 7.97 | 7.97 |
| DL-Methionine (%) | 0.11 | 0.13 | 0.11 | 0.12 | 0.13 |
| L-Lysine HCl (%) | 0.09 | 0.06 | 0.10 | 0.09 | 0.08 |
| Vitamin Premix (%) | | | 0.025% | | |
| Trace Mineral Mix (%) | | | 0.075% | | |
| Other[A] (%) | | | to 100% | | |
| Ration Cost/Ton of Feed | $120.91 | $131.99 | $119.88 | $126.33 | $131.07 |

[A]Other = Choline chloride and salt added to help meet requirements for choline and sodium.

TABLE 4b

Calculated nutrient composition (As Is Basis) of test diets for Phase 2

| | Yellow Dent Corn | | High Oleic High Oil Corn | | |
|---|---|---|---|---|---|
| Nutrients | LND | HND | LND | HND | VHD |
| ME (kcal/lb) | 1270 | 1361 | 1270 | 1361 | 1384 |
| Crude Protein (%) | 14.00 [1.10][A] | 15.00 [1.10] | 14.00 [1.10] | 15.00 [1.10] | 15.00 [1.08] |
| Crude Fat (%) | 3.09 | 5.31 | 4.55 | 5.23 | 6.78 |
| Crude Fiber (%) | 2.42 | 2.16 | 2.59 | 2.24 | 2.24 |
| Calcium (%) | 3.32 [0.26] | 3.54 [0.26] | 3.32 [0.26] | 3.56 [0.26] | 3.56 [0.26] |
| Avail. Phosphorus (%) | 0.40 [0.031] | 0.43 [0.032] | 0.40 [0.031] | 0.43 [0.032] | 0.43 [0.031] |
| Total Phosphorus (%) | 0.60 | 0.64 | 0.57 | 0.61 | 0.61 |
| Sodium (%) | 0.16 [0.013] | 0.17 [0.012] | 0.16 [0.013] | 0.17 [0.012] | 0.17 [0.012] |
| Arginine (%) | 0.90 [0.071] | 0.99 [0.073] | 0.86 [0.068] | 0.95 [0.070] | 0.95 [0.069] |
| Lysine (%) | 0.73 [0.057] | 0.78 [0.057] | 0.73 [0.057] | 0.78 [0.057] | 0.78 [0.056] |
| Digestible Lysine (%) | 0.68 [0.054] | 0.73 [0.054] | 0.68 [0.054] | 0.73 [0.054] | 0.73 [0.053] |
| Methionine (%) | 0.37 [0.029] | 0.40 [0.029] | 0.37 [0.029] | 0.39 [0.029] | 0.39 [0.028] |
| MET + CYS (%) | 0.64 [0.050] | 0.69 [0.051] | 0.64 [0.050] | 0.69 [0.051] | 0.69 [0.050] |
| Digestible MET +CYS (%) | 0.58 [0.046] | 0.62 [0.046] | 0.58 [0.046] | 0.62 [0.046] | 0.62 [0.045] |
| Tryptophan (%) | 0.19 [0.015] | 0.21 [0.015] | 0.16 [0.013] | 0.17 [0.012] | 0.17 [0.012] |
| Choline (g/kg) | 1.06 [0.083] | 1.14 [0.083] | 1.06 [0.083] | 1.14 [0.083] | 1.14 [0.082] |

[A]Numbers in brackets represent nutrient as percentage of dietary ME. [ = (Nutrient/ME)*100].

TABLE 5a

Ingredient composition of test diets for Phase 3

| | Yellow Dent Corn | | High Oleic High Oil Corn | | |
|---|---|---|---|---|---|
| Ingredients | LND | HND | LND | HND | VHD |
| Yellow Dent Corn (%) | 70.48 | 70.43 | — | — | — |
| High Oleic HOC (%) | — | — | 68.67 | 73.63 | 70.43 |
| Soybean meal - 48 (%) | 12.52 | 14.83 | 11.92 | 13.47 | 14.00 |
| Wheat Midds (%) | 4.93 | — | 7.34 | — | 0.84 |
| An/Veg Fat (%) | — | 1.99 | — | 0.17 | 1.99 |
| Meat Blend 58% (%) | 3.00 | 3.00 | 3.00 | 3.00 | 3.00 |
| Dicalcium Phosphate (%) | 1.04 | 1.16 | 1.11 | 1.22 | 1.23 |
| Limestone (%) | 7.36 | 7.89 | 7.30 | 7.84 | 7.84 |
| DL-Methionine (%) | 0.09 | 0.11 | 0.09 | 0.10 | 0.10 |
| L-Lysine HCl (%) | 0.10 | 0.07 | 0.11 | 0.10 | 0.09 |
| Vitamin Premix (%) | 0.025% | | | | |
| Trace Mineral Mix (%) | 0.075% | | | | |
| Other[A] (%) | to 100% | | | | |
| Ration Cost/Ton of Feed | $118.31 | $127.96 | $117.27 | $122.00 | $127.03 |

[A]Other = Choline chloride and salt added to help meet requirements for choline and sodium.

TABLE 5b

Calculated nutrient composition (As Is Basis) of test diets for Phase 3

| | Yellow Dent Corn | | High Oleic High Oil Corn | | |
|---|---|---|---|---|---|
| Nutrients | LND | HND | LND | HND | VHD |
| ME (kcal/lb) | 1270 | 1361 | 1270 | 1361 | 1385 |
| Crude Protein (%) | 13.50 [1.06][A] | 14.47 [1.06] | 13.50 [1.06] | 14.47 [1.06] | 14.47 [1.04] |
| Crude Fat (%) | 3.14 | 4.92 | 4.61 | 4.80 | 6.44 |
| Crude Fiber (%) | 2.45 | 2.16 | 2.62 | 2.26 | 2.26 |
| Calcium (%) | 3.25 [0.26] | 3.48 [0.26] | 3.25 [0.26] | 3.48 [0.26] | 3.49 [0.25] |
| Avail. Phosphorus (%) | 0.38 [0.030] | 0.41 [0.030] | 0.38 [0.030] | 0.41 [0.030] | 0.41 [0.030] |
| Total Phosphorus (%) | 0.58 | 0.62 | 0.54 | 0.58 | 0.58 |
| Sodium (%) | 0.15 [0.012] | 0.16 [0.012] | 0.15 [0.012] | 0.16 [0.012] | 0.16 [0.012] |
| Arginine (%) | 0.86 [0.068] | 0.94 [0.069] | 0.82 [0.065] | 0.90 [0.066] | 0.91 [0.066] |
| Lysine (%) | 0.70 [0.055] | 0.75 [0.055] | 0.70 [0.055] | 0.75 [0.055] | 0.75 [0.054] |
| Digestible Lysine (%) | 0.65 [0.051] | 0.70 [0.051] | 0.65 [0.051] | 0.70 [0.051] | 0.70 [0.051] |
| Methionine (%) | 0.34 [0.027] | 0.37 [0.027] | 0.34 [0.027] | 0.36 [0.026] | 0.36 [0.026] |
| MET + CYS (%) | 0.61 [0.048] | 0.66 [0.048] | 0.61 [0.048] | 0.65 [0.048] | 0.65 [0.047] |
| Digestible MET + CYS (%) | 0.55 [0.043] | 0.59 [0.043] | 0.55 [0.043] | 0.59 [0.043] | 0.59 [0.043] |
| Tryptophan (%) | 0.18 [0.014] | 0.20 [0.015] | 0.15 [0.012] | 0.16 [0.012] | 0.16 [0.012] |
| Choline (g/kg) | 1.04 [0.082] | 1.12 [0.082] | 1.04 [0.082] | 1.12 [0.082] | 1.12 [0.081] |

[A]Numbers in brackets represent nutrient as percentage of dietary ME. [ = (Nutrient/ME)*100].

TABLE 6a

Ingredient composition of test diets for Phase 4

| Ingredients | Yellow Dent Corn LND | Yellow Dent Corn HND | High Oleic High Oil Corn LND | High Oleic High Oil Corn HND | High Oleic High Oil Corn VHD |
|---|---|---|---|---|---|
| Yellow Dent Corn (%) | 71.26 | 72.63 | — | — | — |
| High Oleic HOC (%) | — | — | 69.44 | 74.90 | 72.63 |
| Soybean meal - 48 (%) | 11.33 | 13.37 | 10.72 | 12.12 | 12.51 |
| Wheat Midds (%) | 5.57 | — | 8.01 | 0.49 | 0.87 |
| An/Veg Fat (%) | — | 1.51 | — | — | 1.51 |
| Meat Blend 58% (%) | 3.00 | 3.00 | 3.00 | 3.00 | 3.00 |
| Dicalcium Phosphate (%) | 0.89 | 1.00 | 0.96 | 1.06 | 1.07 |
| Limestone (%) | 7.33 | 7.85 | 7.26 | 7.80 | 7.80 |
| DL-Methionine (%) | 0.08 | 0.09 | 0.07 | 0.08 | 0.08 |
| L-Lysine HCl (%) | 0.10 | 0.08 | 0.11 | 0.11 | 0.10 |
| Vitamin Premix (%) | | | 0.025% | | |
| Trace Mineral Mix (%) | | | 0.075% | | |
| Other^A (%) | | | to 100% | | |
| Ration Cost/Ton of Feed | $115.55 | $123.71 | $114.51 | $118.57 | $122.75 |

^AOther = Choline chloride and salt added to help meet requirements for choline and sodium.

TABLE 6b

Calculated nutrient composition (As Is Basis) of test diets for Phase 4

| Nutrients | Yellow Dent Corn LND | Yellow Dent Corn HND | High Oleic High Oil Corn LND | High Oleic High Oil Corn HND | High Oleic High Oil Corn VHD |
|---|---|---|---|---|---|
| ME (kcal/lb) | 1270 | 1361 | 1270 | 1361 | 1385 |
| Crude Protein (%) | 13.00 [1.02]^A | 13.93 [1.02] | 13.00 [1.02] | 13.93 [1.02] | 13.93 [1.01] |
| Crude Fat (%) | 3.18 | 4.52 | 4.67 | 4.72 | 6.08 |
| Crude Fiber (%) | 2.48 | 2.17 | 2.66 | 2.29 | 2.27 |
| Calcium (%) | 3.25 [0.25] | 3.43 [0.25] | 3.20 [0.25] | 3.43 [0.25] | 3.43 [0.25] |
| Avail. Phosphorus (%) | 0.35 [0.028] | 0.38 [0.028] | 0.35 [0.028] | 0.38 [0.028] | 0.38 [0.027] |
| Total Phosphorus (%) | 0.55 | 0.58 | 0.51 | 0.55 | 0.55 |
| Sodium (%) | 0.14 [0.011] | 0.15 [0.011] | 0.14 [0.011] | 0.15 [0.011] | 0.15 [0.011] |
| Arginine (%) | 0.82 [0.065] | 0.90 [0.066] | 0.78 [0.061] | 0.86 [0.063] | 0.86 [0.062] |
| Lysine (%) | 0.67 [0.053] | 0.72 [0.053] | 0.67 [0.053] | 0.72 [0.053] | 0.72 [0.052] |
| Digestible Lysine (%) | 0.62 [0.049] | 0.66 [0.048] | 0.62 [0.049] | 0.66 [0.048] | 0.66 [0.048] |
| Methionine (%) | 0.32 [0.025] | 0.34 [0.025] | 0.32 [0.025] | 0.34 [0.025] | 0.34 [0.025] |
| MET + CYS (%) | 0.58 [0.046] | 0.62 [0.046] | 0.58 [0.046] | 0.62 [0.046] | 0.62 [0.045] |
| Digestible MET + CYS (%) | 0.52 [0.041] | 0.56 [0.041] | 0.52 [0.041] | 0.56 [0.041] | 0.56 [0.040] |
| Tryptophan (%) | 0.18 [0.014] | 0.19 [0.014] | 0.14 [0.011] | 0.15 [0.011] | 0.15 [0.011] |
| Choline (g/kg) | 1.02 [0.080] | 1.09 [0.080] | 1.02 [0.080] | 1.09 [0.080] | 1.09 [0.079] |

^ANumbers in brackets represent nutrient as percentage of dietary ME. [ = (Nutrient/ME)*100].

TABLE 7a

Ingredient composition of test diets for Phase 5

| Ingredients | Yellow Dent Corn LND | Yellow Dent Corn HND | High Oleic High Oil Corn LND | High Oleic High Oil Corn HND | High Oleic High Oil Corn VHD |
|---|---|---|---|---|---|
| Yellow Dent Corn (%) | 72.06 | 74.85 | — | — | — |
| High Oleic HOC (%) | — | — | 70.20 | 75.72 | 74.85 |

TABLE 7a-continued

Ingredient composition of test diets for Phase 5

| Ingredients | Yellow Dent Corn | | High Oleic High Oil Corn | | |
|---|---|---|---|---|---|
| | LND | HND | LND | HND | VHD |
| Soybean meal - 48 (%) | 10.14 | 11.90 | 9.53 | 10.83 | 11.01 |
| Wheat Midds (%) | 6.21 | — | 8.68 | 1.21 | 0.89 |
| An/Veg Fat (%) | — | 1.02 | — | — | 1.02 |
| Meat Blend 58% (%) | 3.00 | 3.00 | 3.00 | 3.00 | 3.00 |
| Dicalcium Phosphate (%) | 0.74 | 0.83 | 0.80 | 0.89 | 0.89 |
| Limestone (%) | 7.29 | 7.81 | 7.23 | 7.76 | 7.76 |
| DL-Methionine (%) | 0.06 | 0.06 | 0.06 | 0.06 | 0.06 |
| L-Lysine HCl (%) | 0.11 | 0.09 | 0.12 | 0.11 | 0.11 |
| Vitamin Premix (%) | | | 0.025% | | |
| Trace Mineral Mix (%) | | | 0.075% | | |
| Other[A] (%) | | | to 100% | | |
| Ration Cost/Ton of Feed | $112.80 | $119.50 | $111.74 | $115.65 | $118.51 |

[A]Other = Choline chloride and salt added to help meet requirements for choline and sodium.

the corn source utilized in this study, such that feeding the high oleic high oil corn diets, regardless of nutrient density, translated to the highest oleic fatty acid levels in egg yolks compared to hens fed regular corn based diets. Linoleic fatty acid (C18:2) levels were significantly ($P<0.05$) lower from egg yolks of hens fed the high oleic high oil corn based diets, despite different nutrient densities. The highest linoleic fatty acid content was observed with yolks produced by hens fed the regular corn/LND diet. The oleic:linoleic fatty acid ratio was significantly ($P<0.05$) higher from the yolks of hens fed the high oleic high oil corn, regardless of nutrient density level of the diet. The greatest percentage ($P<0.05$) of monounsaturated fatty acids coincided with hens fed the high oleic high oil corn based diets, regardless of nutrient density level. The lowest monounsaturated fatty acid levels was observed for hens fed the regular corn diets. The polyunsaturated fatty acid levels were significantly ($P<0.05$) affected by the corn source, such that the lowest levels occurred with yolks from hens fed the high oleic high oil corn based diets.

TABLE 7b

Calculated nutrient composition (As Is Basis) of test diets for Phase 5

| Nutrients | Yellow Dent Corn | | High Oleic High Oil Corn | | |
|---|---|---|---|---|---|
| | LND | HND | LND | HND | VHD |
| ME (kcal/lb) | 1270 | 1361 | 1270 | 1361 | 1386 |
| Crude Protein (%) | 12.50 [0.98][A] | 13.40 [0.98] | 12.50 [0.98] | 13.40 [0.98] | 13.40 [0.97] |
| Crude Fat (%) | 3.22 | 4.11 | 4.73 | 4.78 | 5.72 |
| Crude Fiber (%) | 2.52 | 2.18 | 2.69 | 2.32 | 2.28 |
| Calcium (%) | 3.15 [0.25] | 3.38 [0.25] | 3.15 [0.25] | 3.38 [0.25] | 3.38 [0.24] |
| Avail. Phosphorus (%) | 0.32 [0.025] | 0.34 [0.025] | 0.32 [0.025] | 0.34 [0.025] | 0.34 [0.025] |
| Total Phosphorus (%) | 0.51 | 0.55 | 0.47 | 0.51 | 0.51 |
| Sodium (%) | 0.13 [0.010] | 0.14 [0.010] | 0.13 [0.010] | 0.14 [0.010] | 0.14 [0.010] |
| Arginine (%) | 0.78 [0.061] | 0.86 [0.063] | 0.74 [0.058] | 0.81 [0.060] | 0.82 [0.059] |
| Lysine (%) | 0.64 [0.050] | 0.68 [0.050] | 0.64 [0.050] | 0.69 [0.051] | 0.69 [0.050] |
| Digestible Lysine (%) | 0.59 [0.046] | 0.63 [0.046] | 0.59 [0.046] | 0.63 [0.046] | 0.63 [0.045] |
| Methionine (%) | 0.29 [0.023] | 0.31 [0.023] | 0.29 [0.023] | 0.31 [0.023] | 0.31 [0.022] |
| MET + CYS (%) | 0.55 [0.043] | 0.59 [0.043] | 0.55 [0.043] | 0.59 [0.043] | 0.59 [0.043] |
| Digestible MET + CYS (%) | 0.49 [0.039] | 0.53 [0.039] | 0.49 [0.039] | 0.53 [0.039] | 0.52 [0.038] |
| Tryptophan (%) | 0.17 [0.013] | 0.18 [0.013] | 0.13 [0.010] | 0.14 [0.010] | 0.14 [0.010] |
| Choline (g/kg) | 1.00 [0.079] | 1.07 [0.079] | 1.00 [0.079] | 1.07 [0.079] | 1.07 [0.077] |

[A]Numbers in brackets represent nutrient as percentage of dietary ME. [ = (Nutrient/ME)*100].

Measurements of yolk fatty acids were taken at day 140 of the trial. Egg yolk total cholesterol, high density lipoprotein (HDL) and low density lipoprotein (LDL) were measured at day 140, while total egg cholesterol were conducted on egg samples at days 0, 28, 56, 84, 112 and 140.

As can be seen from Table 8, the oleic fatty acid (C18:1) content of the yolks was significantly ($P<0.05$) influenced by

TABLE 8

Effect of corn source and nutrient density levels on yolk fatty acid analyses at Day 140

| Treatment | | | Yolk Fatty Acid Profiles | | | | | | | |
|---|---|---|---|---|---|---|---|---|---|---|
| Corn Type | Nutrient Density | Energy Level* | Total[1] | C16:0 | C16:1 | C18:0 | C18:1 | C18:2 | C20:1 | C18:1/C18:2 Ratio |
| | | | | | % of Total Fatty Acids | | | | | |
| YDC | LND | 1270 | 99.89 | 28.58a | 1.56 | 12.73 | 33.69b | 14.01a | 0.083 | 2.43b |
| YDC | HND | 1361 | 99.99 | 28.72a | 1.40 | 12.83 | 34.00b | 13.45b | 0.060 | 2.54b |
| HOHOC | LND | 1270 | 99.97 | 28.03b | 1.34 | 13.16 | 35.63a | 12.34c | 0.097 | 2.91a |
| HOHOC | HND | 1361 | 99.98 | 28.52a | 1.30 | 12.80 | 35.61a | 12.15c | 0.050 | 2.98a |
| HOHOC | VHD | 1386 | 99.98 | 28.11b | 1.39 | 12.72 | 36.44a | 12.11c | 0.053 | 3.04a |
| SEM | | | 0003 | 0.18 | 0.07 | 0.18 | 0.61 | 0.24 | 0.049 | 0.09 |
| Statistical Analyses: | | | | | | | | | | |
| $R^2$ | | | 0.6810 | 0.8686 | 0.5468 | 0.7692 | 0.7010 | 0.9284 | 0.6614 | 0.8477 |
| Treatment | | | 0.1869 | 0.0264 | 0.1498 | 0.4208 | 0.0079 | 0.0001 | 0.9527 | 0.0001 |

| Treatment | | | Yolk Fatty Acid Profiles | | | Unsaturated Fatty Acids | | Total Saturated | Total Unsaturated |
|---|---|---|---|---|---|---|---|---|---|
| Corn Type | Nutrient Density | Energy Level* | C22:0 | C24:0 | C24:1 | Mono | Poly | Fatty Acids | Fatty Acids |
| | | | | | | % of Total Fatty Acids | | | |
| YDC | LND | 1270 | 5.95 | 1.81a | 1.50 | 36.83c | 14.01a | 49.07 | 50.84 |
| YDC | HND | 1361 | 6.17 | 1.77ab | 1.59 | 37.05bc | 13.45a | 49.50 | 50.50 |
| HOHOC | LND | 1270 | 6.15 | 1.58bc | 1.64 | 38.70a | 12.34b | 48.92 | 51.04 |
| HOHOC | HND | 1361 | 6.33 | 1.65ab | 1.59 | 38.55ab | 12.15b | 49.30 | 50.70 |
| HOHOC | VHD | 1386 | 6.11 | 1.41c | 1.63 | 39.51a | 12.11b | 48.35 | 51.62 |
| SEM | | | 0.19 | 0.09 | 0.13 | 0.57 | 0.24 | 0.57 | 0.44 |
| Statistical Analyses: | | | | | | | | | |
| $R^2$ | | | 0.0190 | 0.0979 | 0.0049 | 0.7062 | 0.9284 | 0.0340 | 0.0321 |
| Treatment | | | 0.5905 | 0.0046 | 0.9501 | 0.0056 | 0.0001 | 0.2818 | 0.3120 | abcd Means with the same letter within a column are not statistically significant at P < 0.050.
[1]Total = Total fatty acid recovery during analyses.
*Energy levels represent the dietary energy levels of phase I only.

In addition to a change in fatty acid composition, the high oleic feed source also caused a change in the egg cholesterol level.

When yolk cholesterol (Table 9) is expressed on a gram/100 gram basis, it was significantly (P<0.05) influenced by the diets during all production periods and the average of all production periods. Starting with the measurements taken on day 56 and continuing for the rest of the study, the highest cholesterol levels were observed from yolks produced by hens fed the YDC diet versus the HOHOC diets. The lowest yolk cholesterol level was observed with hens fed the HOHOC diet, and in particular, the HOHOC/LND diet. By averaging cholesterol levels across all production periods, significant differences due to corn source and nutrient density exist. Feeding the YDC/HND diet led to the highest cholesterol levels compared to all other treatments. By lowering the nutrient density content of the diet (YDC/LND), the cholesterol content was decreased significantly. As energy level increased within the high oleic high oil corn treatments, cholesterol levels significantly increased, but these levels were still lower than the regular corn based diets.

TABLE 9

Effect of corn source and nutrient density levels on total yolk cholesterol levels

| Treatment | | | Production Period | | | | | | |
|---|---|---|---|---|---|---|---|---|---|
| Corn Type | Nutrient Density | Energy Level* | Day 0 | Day 28 | Day 56 | Day 84 | Day 112 | Day 140 | MEAN |
| | | | | | g/100 g (As Is Basis) | | | | |
| YDC | LND | 1270 | 1.159 | 1.297ab | 1.349b | 1.403a | 1.507a | 1.616a | 1.420b |
| YDC | HND | 1361 | 1.167 | 1.311a | 1.403a | 1.436a | 1.545a | 1.607a | 1.451a |
| HOHOC | LND | 1270 | 1.167 | 1.265bc | 1.247d | 1.273c | 1.379c | 1.417c | 1.305e |
| HOHOC | HND | 1361 | 1.189 | 1.244c | 1.267cd | 1.331b | 1.441b | 1.474b | 1.337d |
| HOHOC | VHD | 1386 | 1.171 | 1.286abc | 1.297c | 1.315b | 1.431b | 1.516b | 1.357c |
| SEM | | | 0.012 | 0.015 | 0.015 | 0.014 | 0.015 | 0.016 | 0.007 |
| Statistical Analyses: | | | | | | | | | |
| $R^2$ | | | 0.0486 | 0.1473 | 0.4919 | 0.5666 | 0.5347 | 0.6239 | 0.8152 |
| Treatment (Pr < F) | | | 0.4721 | 0.0233 | 0.0001 | 0.0001 | 0.0001 | 0.0001 | 0.0001 | abcde Means with the same letter within a column are not statistically significant at P < 0.050.
*Energy levels represent the dietary energy levels of phase I only.

When measured on a per egg basis (Table 10), the egg cholesterol levels from the hens fed the YDC diet were higher than the HOHOC diet with comparable nutrient density. This trend was statistically significant when calculated as the average across all production periods.

When expressing total cholesterol, HDL and LDL content on a g/egg weight basis (Table 12), HDL level/egg was significantly greater for the treatments fed HOHOC. Total cholesterol and LDL were each lower for the treatment fed the HOHOC.

TABLE 10

Effect of corn source and nutrient density levels on total yolk cholesterol expressed on egg basis

| Treatment | | | Production Period | | | | | |
|---|---|---|---|---|---|---|---|---|
| Corn Type | Nutrient Density | Energy Level* | Day 28 | Day 56 | Day 84 | Day 112 | Day 140 | MEAN |
| | | | | | g/egg (As Is Basis) | | | |
| YDC | LND | 1270 | 0.181 | 0.189bc | 0.206a | 0.252 | 0.274ab | 0.221a |
| YDC | HND | 1361 | 0.190 | 0.205a | 0.205a | 0.249 | 0.280a | 0.226a |
| HOHOC | LND | 1270 | 0.178 | 0.182c | 0.186b | 0.228 | 0.248c | 0.205c |
| HOHOC | RND | 1361 | 0.175 | 0.193b | 0.198a | 0.244 | 0.259bc | 0.214b |
| HOHOC | VHD | 1386 | 0.181 | 0.197b | 0.202a | 0.248 | 0.270ab | 0.220ab |
| SEM | | | 0.004 | 0.003 | 0.004 | 0.006 | 0.005 | 0.002 |
| Statistical Analyses: | | | | | | | | |
| $R^2$ | | | 0.0904 | 0.2626 | 0.2190 | 0.1125 | 0.2351 | 0.4195 |
| Treatment (Pr < F) | | | 0.1512 | 0.0002 | 0.0015 | 0.0758 | 0.0008 | 0.0001 | abcd Means with the same letter within a column are not statistically significant at $P < 0.050$.
*Energy levels represent the dietary energy levels of phase I only.

When examining the Day 140 cholesterol, HDL and LDL contents of the yolk as expressed on a gram/100 gram basis (Table 11), these parameters were significantly ($P<0.05$) affected by the treatments supplied to the hens. The lowest cholesterol levels corresponded with the feeding of the high oleic high oil corn diets. The highest cholesterol levels were observed with hens fed the regular YDC based diets. The HDL level (g/100 g of yolk) was significantly higher for the high oleic 10 high oil corn based diets, regardless of the nutrient density level while the LDL content (g/100 g yolk) was consistently lower for the high oleic high oil corn based diets.

TABLE 11

Effect of corn source and nutrient density levels on day 140 yolk cholesterol levels

| | | | | g/100 g (As Is Basis) | |
|---|---|---|---|---|---|
| Treatment | | | Total | | |
| Corn Type | Nutrient Density | Energy Level* | Choles- terol | High Density Lipoproteins | Low Density Lipoproteins |
| YDC | LND | 1270 | 1.484ab | 0.353b | 0.891a |
| YDC | HND | 1361 | 1.504a | 0.332b | 0.917a |
| HOHOC | LND | 1270 | 1.391c | 0.429a | 0.821b |
| HOHOC | HND | 1361 | 1.398c | 0.413a | 0.837b |
| HOHOC | VHD | 1386 | 1.423bc | 0.427a | 0.826b |
| | SEM | | 0.026 | 0.010 | 0.019 |
| Statistical Analyses: | | | | | |
| | R2 | | 0.1810 | 0.5178 | 0.2319 |
| | Treatment | | 0.0068 | 0.0001 | 0.0009 | abcMeans with the same letter within a column are not statistically significant at $P < 0.050$.
*Energy levels represent the dietary energy levels of phase I only.

TABLE 12

Effect of corn source and nutrient density levels on day 140 yolk cholesterol levels, expressed on egg basis

| | | | | g/egg (As Is Basis) | |
|---|---|---|---|---|---|
| Treatment | | | Total | | |
| Corn Type | Nutrient Density | Energy Level* | Choles- terol | High Density Lipoproteins | Low Density Lipoproteins |
| YDC | LND | 1270 | 0.252 | 0.060b | 0.151 |
| YDC | HND | 1361 | 0.261 | 0.058b | 0.160 |
| HOHOC | LND | 1270 | 0.243 | 0.075a | 0.144 |
| HOHOC | HND | 1361 | 0.246 | 0.073a | 0.147 |
| HOHOC | VHD | 1386 | 0.253 | 0.076a | 0.147 |
| | SEM | | 0.006 | 0.002 | 0.004 |
| Statistical Analyses: | | | | | |
| | $R^2$ | | 0.0782 | 0.5316 | 0.1152 |
| | Treatment | | 0.2162 | 0.0001 | 0.0695 | abcdMeans with the same letter within a column are not statistically significant at $P < 0.050$.
*Energy levels represent the dietary energy levels of phase I only.

EXAMPLE 2

Four hundred pullets (18 weeks of age) of a commercial strain (HyLine W-36) were obtained and placed on a common preconditioning ration that contained yellow dent corn. Birds were fed the preconditioning ration for two weeks, and at 20 weeks of age hens were wing-banded and placed on experimental treatments. Five groups of hens were fed varying amounts of yellow dent corn (YDC) and/or HOHOC corn. Each treatment group consisted of 75 laying hens with 15 replicates per treatment. Each replicate (cage) contained five hens. Birds were replaced prior to Day 0 of the experimental period due to mortality or humane reasons, resulting in a total number of 375 hens used in the study. Hens were observed daily for signs of production and/or behavioral changes; birds found dead or moribund were recorded and removed. Daily temperature was recorded, with a temperature goal of 75° F. Individual continuous cage dimensions were 12" wide×18" long×18" high. Each cage row contained continuous cages×1 tier high. No medication of any kind was administered to hens during the preconditioning period and/or the experimental feeding period.

Nutrient compositions of the two corns and soybean meal used in the study are listed in Table 13. All rations were balanced with equal/or similar nutrient contents in order to meet or exceed the NRC (1994) nutrient recommendations and simulate commercial conditions/breeder recommendations. Feed and water were supplied ad-libitum. The feeding phases (28 days/phase) were: Preconditioning;

Layer Phase1 (Day 0–28), Layer Phase 2 (Day 29–56); Layer Phase 3 (Day 57–10 84); Layer Phase 4 (Day 85–112); Layer Phase 5 (Day 113–140); Layer Phase 6 (Day 141–168) and Layer Phase 7 (Day 169–196). All hens were fed the same Preconditioning diet prior to the start of Layer Phase 1. The five treatments, fed in mash form, were: 1) YDC-100% (control); 2) YDC/HOHOC, 75%/25%; 3) YDC/HOHOC, 50%/50%; 4) YDC/HOHOC 25%/75% and 5) HOHOC-100%. Nutrient requirements were adjusted for increasing feed intake that occurred with each changing layer phase. Nutrient composition of the diet is shown in Tables 14–20.

TABLE 13

Nutrient composition of yellow dent corn* and high oleic high oil corn[A]

| Nutrient | Yellow Dent Corn | High Oleic High Oil Corn | Soybean Meal | An/Veg Fat |
|---|---|---|---|---|
| As Fed Basis | | | | |
| Dry Matter (%) | 85.40 | 86.90 | 88.30 | |
| Crude Protein (%) | 7.6 | 7.4 | 47.90 | |
| TMEn (kcal/lb)[B] | 1563 | 1622 | 1106 | 4100 |
| Crude Fat (%) | 3.86 | 6.34 | 1.39 | |
| Crude Fiber (%) | 2.05 | 3.15 | 3.40 | |
| Ash (%) | 1.4 | 1.2 | 5.80 | |
| Total Phosphorus (%) | 0.215 | 0.255 | 0.68 | |
| Phytic Acid Phosphorus (%) | 0.205 | 0.20 | 0.417 | |
| Available Phosphorus (%) | 0.010 | 0.05 | 0.263 | |
| Calcium (%) | 0.060 | 0.013 | 0.30 | |
| Essential Amino Acids: | | | | |
| Arginine (%) | 0.374 | 0.411 | 3.589 | |
| Cystine (%) | 0.225 | 0.248 | 0.803 | |
| Histidine (%) | 0.237 | 0.252 | 1.316 | |
| Isoleucine (%) | 0.248 | 0.252 | 2.295 | |

TABLE 13-continued

Nutrient composition of yellow dent corn* and high oleic high oil corn[A]

| Nutrient | Yellow Dent Corn | High Oleic High Oil Corn | Soybean Meal | An/Veg Fat |
|---|---|---|---|---|
| Leucine (%) | 0.848 | 0.844 | 3.869 | |
| Lysine (%) | 0.250 | 0.271 | 3.113 | |
| Methionine (%) | 0.180 | 0.181 | 0.922 | |
| TSAA (%) | 0.405 | 0.429 | 1.725 | |
| Phenylalanine (%) | 0.342 | 0.341 | 2.528 | |
| Tyrosine (%) | 0.298 | 0.294 | 1.990 | |
| Threonine (%) | 0.260 | 0.273 | 1.945 | |
| Tryptophan (%) | 0.058 | 0.062 | 0.615 | |
| Valine (%) | 0.360 | 0.376 | 2.454 | |
| Nonessential Amino Acids: | | | | |
| Alanine (%) | 0.536 | 0.548 | 2.188 | |
| Aspartic Acid (%) | 0.522 | 0.509 | 6.26 | |
| Glutamic Acid (%) | 1.287 | 1.265 | 9.173 | |
| Glycine (%) | 0.288 | 0.306 | 2.053 | |
| Serine (%) | 0.346 | 0.352 | 2.513 | |
| Fatty Acids (%): | | | | |
| C16:0 | 10.670 | 9.212 | 14.713 | 22.767 |
| C16:1 | 0.182 | 0.172 | 0.191 | 2.459 |
| C18:0 | 1.612 | 2.180 | 4.013 | 11.940 |
| C18:1 | 24.646 | 59.051 | 15.743 | 43.717 |
| C18:2 | 60.248 | 26.852 | 54.733 | 13.358 |
| C18:3 | 1.465 | 1.082 | 8.525 | 0.598 |
| C20:0 | 0.536 | 0.544 | 0.231 | 0.211 |
| C20:1 | 0.408 | 0.428 | 0.182 | 0.944 |
| C22:0 | | 0.102 | 0.288 | |
| C24:0 | 0.296 | 0.132 | 0.412 | 0.285 |
| C24:1 | | 0.161 | 0.498 | 0.147 |

[A]Analyses based on one sample per corn. Corn nutrients adjusted to 13.7% moisture (86.3% dry matter) for yellow dent corn and 13.6% moisture (86.4% dry matter) for high oleic high oil corn for feed formulation purposes. These moisture levels were the levels reported for the corns upon arrival at the research facility.
[B]TMEn values for both corns were determined by the equation from Araba et al., 1998. The TMEn values for the soybean meal and blended (animal/vegetable) fat supplied by the research facility.

TABLE 14a

Ingredient composition of test diets for Phase 1 (95 g/h/d)

| Ingredients | YDC 100% (Control) | HOHOC Treatments | | | |
|---|---|---|---|---|---|
| | | 75%/25%[A] | 50%/50% | 25%/75% | 0%/100% |
| Yellow Dent Corn (%) | 58.81 | 44.64 | 30.09 | 15.09 | 0.00 |
| HOHOC (%) | 0.00 | 14.80 | 30.00 | 45.40 | 60.85 |
| Soybean meal - 48 (%) | 25.85 | 25.65 | 25.46 | 25.47 | 25.53 |
| An/Veg Fat (%) | 4.51 | 4.08 | 3.64 | 3.23 | 2.83 |
| Dicalcium Phosphate (%) | 2.13 | 2.10 | 2.07 | 2.04 | 2.01 |
| Limestone (%) | 7.80 | 7.82 | 7.84 | 7.86 | 7.87 |
| DL-Methionine (%) | 0.16 | 0.16 | 0.16 | 0.16 | 0.16 |
| L-Lysine HCl (%) | 0.01 | 0.01 | 0.01 | 0.01 | 0.00 |
| Vitamin Premix (%) | | | 0.025 | | |
| Trace Mineral Mix (%) | | | 0.075 | | |
| Other[A] (%) | | | to 100% | | |

TABLE 14a-continued

Ingredient composition of test diets for Phase 1 (95 g/h/d)

| | YDC 100% | HOHOC Treatments | | | |
|---|---|---|---|---|---|
| Ingredients | (Control) | 75%/25%A | 50%/50% | 25%/75% | 0%/100% |

[A]Other = Choline chloride and salt added to help meet requirements for choline and sodium.

TABLE 14b

Calculated nutrient composition (As Is Basis) of test diets for Phase 1 (95 g/h/d)

| | YDC 100% | HOHOC Treatments | | | |
|---|---|---|---|---|---|
| Nutrients | (Control) | 75%/25%A | 50%/50% | 25%/75% | 0%/100% |
| Moisture (%) | 11.11 | 11.16 | 11.21 | 11.25 | 11.29 |
| ME (kcal/lb) {1330}[B] | 1330 | 1330 | 1330 | 1330 | 1330 |
| Crude Protein (%) {16.80} | 17.00 | 16.91 | 16.81 | 16.80 | 16.80 |
| Crude Fat (%) | 7.07 | 7.03 | 6.98 | 6.97 | 6.97 |
| Crude Fiber (%) | 2.08 | 2.25 | 2.42 | 2.60 | 2.77 |
| Ash (%) | 11.78 | 11.74 | 11.70 | 11.67 | 11.64 |
| Calcium (%) {3.55} | 3.55 | 3.55 | 3.55 | 3.55 | 3.55 |
| Avail. Phosphorus (%){0.50} | 0.50 | 0.50 | 0.50 | 0.50 | 0.50 |
| Total Phosphorus (%) | 0.73 | 0.73 | 0.73 | 0.73 | 0.73 |
| Phytate Phosphorus (%) | 0.23 | 0.23 | 0.23 | 0.23 | 0.23 |
| Sodium (%) {0.23} | 0.23 | 0.23 | 0.23 | 0.23 | 0.23 |
| Arginine (%) {1.15} | 1.15 | 1.15 | 1.15 | 1.16 | 1.17 |
| Cystine (%) | 0.34 | 0.34 | 0.35 | 0.35 | 0.35 |
| Histidine (%) | 0.48 | 0.48 | 0.48 | 0.48 | 0.49 |
| Isoleucine (%) | 0.74 | 0.74 | 0.73 | 0.74 | 0.74 |
| Leucine (%) | 1.50 | 1.50 | 1.49 | 1.50 | 1.50 |
| Lysine (%) {0.95} | 0.96 | 0.96 | 0.96 | 0.96 | 0.96 |
| Methionine (%) {0.50} | 0.50 | 0.50 | 0.50 | 0.50 | 0.50 |
| MET + CYS (%) {0.82} | 0.84 | 0.84 | 0.85 | 0.85 | 0.85 |
| Phenylalanine (%) | 0.86 | 0.85 | 0.85 | 0.85 | 0.85 |
| Tyrosine (%) | 0.69 | 0.69 | 0.68 | 0.68 | 0.69 |
| Threonine (%) {0.64} | 0.66 | 0.66 | 0.66 | 0.66 | 0.66 |
| Tryptophan (%) {0.17} | 0.19 | 0.19 | 0.19 | 0.19 | 0.19 |
| Valine (%) | 0.85 | 0.85 | 0.85 | 0.85 | 0.85 |

[A]First number before the slash represents the percentage of corn coming from YDC while the number after the slash represents percentage of corn as HOHOC.
[B]Numbers in { } represent requirement specified for feed formulation purposes.

TABLE 14c

Calculated fatty acid composition of test diets for Phase 1 (95 g/h/d)

| | YDC 100% | HOHOC Treatments | | | |
|---|---|---|---|---|---|
| Fatty Acids | (Control) | 75%/25%A | 50%/50% | 25%/75% | 0%/100% |
| | | % (As Is Basis) | | | |
| C14:0 (Myristic) | | | | | |
| C16:0 (Palmitic) | 1.303 | 1.234 | 1.163 | 1.099 | 1.038 |
| C16:1 (Palmitoleic) | 0.114 | 0.104 | 0.094 | 0.085 | 0.076 |
| C18:0 (Stearic) | 0.579 | 0.540 | 0.500 | 0.464 | 0.429 |
| C18:1 (Oleic) | 2.552 | 2.782 | 3.019 | 3.274 | 3.534 |
| C18:2 (Linoleic) {1.50}[B] | 2.169 | 2.028 | 1.884 | 1.740 | 1.595 |
| C18:3 (Linolenic) | 0.090 | 0.090 | 0.089 | 0.089 | 0.088 |
| C20:0 (Arachidic) | 0.023 | 0.024 | 0.025 | 0.026 | 0.027 |
| Eicosenoic | 0.052 | 0.050 | 0.047 | 0.045 | 0.043 |
| C22:0 (Behenic) | 0.008 | 0.007 | 0.006 | 0.006 | 0.005 |
| C24:0 (Lignoceric) | 0.021 | 0.020 | 0.018 | 0.016 | 0.014 |
| Nervonic | 0.008 | 0.009 | 0.010 | 0.011 | 0.012 |

[A]First number before the slash represents the percentage of corn coming from YDC while the number after the slash represents percentage of corn as HOHOC.
[B]Numbers in { } represent requirement specified for feed formulation purposes.

TABLE 15a

Ingredient composition of test diets for Phase 2 (95 g/h/d)

| Ingredients | YDC 100% (Control) | HOHOC Treatments 75%/25%A | 50%/50% | 25%/75% | 0%/100% |
|---|---|---|---|---|---|
| Yellow Dent Corn (%) | 61.68 | 46.55 | 31.23 | 15.71 | 0.00 |
| High Oleic HOC (%) | 0.00 | 15.50 | 31.20 | 47.10 | 62.56 |
| Soybean meal-48 (%) | 24.44 | 24.49 | 24.53 | 24.58 | 24.73 |
| An/Veg Fat (%) | 3.24 | 2.84 | 2.43 | 2.02 | 1.94 |
| Dicalcium Phosphate (%) | 1.99 | 1.96 | 1.93 | 1.90 | 1.87 |
| Limestone (%) | 7.92 | 7.94 | 7.96 | 7.98 | 8.05 |
| DL-Methionine (%) | 0.10 | 0.09 | 0.09 | 0.09 | 0.09 |
| L-Threonine (%) | 0.003 | 0.00 | 0.00 | 0.00 | 0.00 |
| Vitamin Premix (%) | | | 0.025 | | |
| Trace Mineral Mix (%) | | | 0.075 | | |
| Other[B] (%) | | | to 100% | | |

[A]First number before the slash represents the percentage of corn coming from YDC while the number after the slash represents percentage of corn as HOHOC.
[B]Other = Choline chloride and salt added to help meet requirements for choline and sodium.

TABLE 15b

Calculated nutrient composition (As Is Basis) of test diets for Phase 2 (95 g/h/d)

| Nutrients | YDC 100% (Control) | HOHOC Treatments 75%/25%A | 50%/50% | 25%/75% | 0%/100% |
|---|---|---|---|---|---|
| Moisture (%) | 11.34 | 11.38 | 11.42 | 11.46 | 11.43 |
| ME (kcal/lb) {1310}[B] | 1310 | 1310 | 1310 | 1310 | 1313 |
| Crude Protein (%) {16.50} | 16.50 | 16.50 | 16.50 | 16.50 | 16.50 |
| Crude Fat (%) | 5.92 | 5.92 | 5.91 | 5.90 | 6.18 |
| Crude Fiber (%) | 2.09 | 2.27 | 2.45 | 2.63 | 2.80 |
| Ash (%) | 11.74 | 11.71 | 11.68 | 11.64 | 11.66 |
| Calcium (%) {3.56} | 3.56 | 3.56 | 3.56 | 3.56 | 3.58 |
| Available Phosphorus (%) {0.47} | 0.47 | 0.47 | 0.47 | 0.47 | 0.47 |
| Total Phosphorus (%) | 0.70 | 0.70 | 0.70 | 0.70 | 0.70 |
| Phytate Phosphorus (%) | 0.23 | 0.23 | 0.23 | 0.23 | 0.23 |
| Sodium (%) {0.19} | 0.19 | 0.19 | 0.19 | 0.19 | 0.25 |
| Arginine (%) {1.10} | 1.11 | 1.12 | 1.13 | 1.13 | 1.14 |
| Cystine (%) | 0.34 | 0.34 | 0.34 | 0.35 | 0.35 |
| Histidine (%) | 0.47 | 0.47 | 0.48 | 0.48 | 0.48 |
| Isoleucine (%) | 0.72 | 0.72 | 0.72 | 0.72 | 0.72 |
| Leucine (%) | 1.47 | 1.48 | 1.48 | 1.48 | 1.48 |
| Lysine (%) {0.84} | 0.92 | 0.92 | 0.93 | 0.93 | 0.94 |
| Methionine (%) {0.43} | 0.43 | 0.43 | 0.43 | 0.43 | 0.43 |
| MET + CYS (%) {0.72} | 0.77 | 0.77 | 0.77 | 0.78 | 0.78 |
| Phenylalanine (%) | 0.83 | 0.83 | 0.83 | 0.84 | 0.84 |
| Tyrosine (%) | 0.67 | 0.68 | 0.68 | 0.67 | 0.67 |
| Threonine (%) {0.64} | 0.64 | 0.64 | 0.64 | 0.65 | 0.65 |
| Tryptophan (%) {0.18} | 0.19 | 0.19 | 0.19 | 0.19 | 0.19 |
| Valine (%) | 0.82 | 0.83 | 0.83 | 0.84 | 0.84 |

[A]First number before the slash represents the percentage of corn coming from YDC while the number after the slash represents percentage of corn as HOHOC.
[B]Numbers in { } represent requirement specified for feed formulation purposes.

TABLE 15c

Calculated fatty acid composition of test diets for Phase 2 (95 g/h/d)

| Fatty Acids | YDC 100% (Control) | HOHOC Treatments 75%/25%A | 50%/50% | 25%/75% | 0%/100% |
|---|---|---|---|---|---|
| | | % (As Is Basis) | | | |
| C14:0 (Myristic) | | | | | |
| C16:0 (Palmitic) | 1.030 | 0.967 | 0.904 | 0.839 | 0.845 |
| C16:1 (Palmitoleic) | 0.083 | 0.074 | 0.065 | 0.056 | 0.054 |
| C18:0 (Stearic) | 0.432 | 0.397 | 0.361 | 0.324 | 0.326 |
| C18:1 (Oleic) | 2.035 | 2.294 | 2.556 | 2.822 | 3.211 |
| C18:2 (Linoleic) {1.50}[B] | 2.060 | 1.914 | 1.767 | 1.618 | 1.500 |
| C18:3 (Linolenic) | 0.083 | 0.083 | 0.082 | 0.082 | 0.083 |
| C20:0 (Arachidic) | 0.020 | 0.022 | 0.023 | 0.024 | 0.026 |
| Eicosenoic | 0.041 | 0.039 | 0.037 | 0.035 | 0.036 |
| C22:0 (Behenic) | 0.008 | 0.008 | 0.007 | 0.006 | 0.005 |
| C24:0 (Lignoceric) | 0.018 | 0.016 | 0.015 | 0.013 | 0.012 |
| Nervonic | 0.006 | 0.007 | 0.008 | 0.009 | 0.011 |

[A]First number before the slash represents the percentage of corn coming from YDC while the number after the slash represents percentage of corn as HOHOC.
[B]Numbers in { } represent requirement specified for feed formulation purposes.

TABLE 16a

Ingredient composition of test diets for Phase 3 (95 g/h/d)

| Ingredients | YDC 100% (Control) | HOHOC Treatments 75%/25%A | 50%/50% | 25%/75% | 0%/100% |
|---|---|---|---|---|---|
| Yellow Dent Corn (%) | 62.84 | 47.64 | 32.11 | 16.11 | 0.00 |
| High Oleic HOC (%) | 0.00 | 15.88 | 32.10 | 48.50 | 63.36 |
| Soybean meal-48 (%) | 24.03 | 23.82 | 23.61 | 23.66 | 23.97 |
| An/Veg Fat (%) | 2.48 | 2.02 | 1.55 | 1.13 | 1.88 |
| Dicalcium Phosphate (%) | 2.00 | 1.97 | 1.94 | 1.91 | 1.88 |
| Limestone (%) | 7.92 | 7.94 | 7.96 | 7.98 | 8.05 |
| DL-Methionine (%) | 0.10 | 0.10 | 0.10 | 0.10 | 0.10 |
| L-Threonine (%) | 0.01 | 0.01 | 0.01 | 0.01 | 0.002 |
| Vitamin Premix (%) | | | 0.025 | | |
| Trace Mineral Mix (%) | | | 0.075 | | |
| Other[B] (%) | | | to 100% | | |

[A]First number before the slash represents the percentage of corn coming from YDC while the number after the slash represents percentage of corn as HOHOC.
[B]Other = Choline chloride and salt added to help meet requirements for choline and sodium.

TABLE 16b

Nutrient composition (As Is Basis) of test diets for Phase 3 (95 g/h/d)

| Nutrients | YDC 100% (Control) | HOHOC Treatments 75%/25%A | 50%/50% | 25%/75% | 0%/100% |
|---|---|---|---|---|---|
| Moisture (%) | 11.45 [10.88][B] | 11.50 [11.20] | 11.56 [11.08] | 11.60 [10.83] | 11.45 [10.70] |
| Gross Energy (kcal/lb) | [1685] | [1665] | [1673] | [1675] | [1716] |
| ME (kcal/lb) {1295}[C] | 1295 | 1295 | 1295 | 1295 | 1316 |
| Crude Protein (%) {16.20} | 16.40 [17.20] | 16.30 [17.36] | 16.20 [16.38] | 16.20 [18.11] | 16.20 [17.05] |
| Crude Fat (%) | 5.22 [4.82] | 5.17 [4.73] | 5.13 [5.10] | 5.12 [5.58] | 6.16 [6.62] |
| Crude Fiber (%) | 2.10 [2.4] | 2.28 [2.6] | 2.46 [2.5] | 2.65 [2.6] | 2.80 [3.1] |
| Ash (%) | 11.74 [11.17] | 11.70 [11.17] | 11.66 [10.45] | 11.62 [12.56] | 11.63 [11.12] |
| Calcium (%) {3.56} | 3.56 [3.03] | 3.56 [3.61] | 3.56 [3.06] | 3.56 [3.41] | 3.58 [3.27] |
| Avail. Phosphorus (%) {0.47} | 0.47 | 0.47 | 0.47 | 0.47 | 0.47 |
| Total Phosphorus (%) | 0.70 [0.69] | 0.70 [0.70] | 0.70 [0.64] | 0.70 [0.66] | 0.70 [0.63] |
| Phytate Phosphorus (%) | 0.23 | 0.23 | 0.23 | 0.23 | 0.23 |
| Sodium (%) {0.19} | 0.19 | 0.19 | 0.19 | 0.19 | 0.25 |

TABLE 16b-continued

Nutrient composition (As Is Basis) of test diets for Phase 3 (95 g/h/d)

| Nutrients | YDC 100% (Control) | HOHOC Treatments | | | |
|---|---|---|---|---|---|
| | | 75%/25%A | 50%/50% | 25%/75% | 0%/100% |
| Arginine (%) {1.10} | 1.10 [1.03] | 1.10 [0.98] | 1.10 [0.96] | 1.11 [1.10] | 1.12 [1.03] |
| Cystine (%) | 0.34 [0.26] | 0.34 [0.23] | 0.34 [0.25] | 0.35 [0.26] | 0.35 [0.26] |
| Histidine (%) | 0.47 [0.44] | 0.47 [0.41] | 0.47 [0.41] | 0.47 [0.45] | 0.47 [0.43] |
| Isoleucine (%) | 0.71 [0.69] | 0.71 [0.64] | 0.70 [0.63] | 0.70 [0.72] | 0.71 [0.67] |
| Leucine (%) | 1.47 [1.40] | 1.46 [1.30] | 1.46 [1.31] | 1.46 [1.46] | 1.46 [1.37] |
| Lysine (%) {0.84} | 0.91 [0.85] | 0.90 [0.79] | 0.90 [0.78] | 0.91 [0.90] | 0.92 [0.84] |
| Methionine (%) {0.43} | 0.43 [0.33] | 0.43 [0.34] | 0.43 [0.32] | 0.43 [0.32] | 0.43 [0.33] |
| MET + CYS (%) {0.72} | 0.77 [0.59] | 0.77 [0.57] | 0.77 [0.57] | 0.78 [0.58] | 0.78 [0.59] |
| Phenylalanine (%) | 0.82 [0.81] | 0.82 [0.74] | 0.82 [0.73] | 0.82 [0.83] | 0.82 [0.78] |
| Tyrosine (%) | 0.67 [0.36] | 0.66 [0.33] | 0.66 [0.33] | 0.66 [0.38] | 0.66 [0.35] |
| Threonine (%) {0.64} | 0.64 [0.66] | 0.64 [0.62] | 0.64 [0.61] | 0.64 [0.69] | 0.64 [0.64] |
| Tryptophan (%) {0.18} | 0.18 [0.18] | 0.18 [0.16] | 0.18 [0.17] | 0.19 [0.21] | 0.19 [0.20] |
| Valine (%) | 0.82 [0.77] | 0.82 [0.72] | 0.82 [0.71] | 0.82 [0.80] | 0.82 [0.75] |

[A]First number before the slash represents the percentage of corn coming from YDC while the number after the slash represents percentage of corn as HOHOC.
[B]Numbers in brackets represent actual analyzed total values.
[C]Numbers in { } represent requirement specified for feed formulation purposes.

TABLE 16c

Calculated fatty acid composition of test diets for Phase 3 (95 g/h/d)

| Fatty Acids | YDC 100% Control | HOHOC Treatments | | | |
|---|---|---|---|---|---|
| | | 75%/25%A | 50%/50% | 25%/75% | 0%/100% |
| | % (As Is Basis) | | | | |
| C14:0 (Myristic) | [0.03][B] | [0.03] | [0.02] | [0.03] | [0.03] |
| C16:0 (Palmitic) | 0.865 [0.89] | 0.791 [0.83] | 0.715 [0.77] | 0.649 [0.81] | 0.835 [0.96] |
| C16:1 (Palmitoleic) | 0.065 [0.06] | 0.055 [0.05] | 0.044 [0.05] | 0.034 [0.05] | 0.053 [0.06] |
| C18:0 (Stearic) | 0.344 [0.41] | 0.302 [0.37] | 0.259 (0.33] | 0.222 (0.34] | 0.320 [0.41] |
| C18:1 (Oleic) | 1.721 [1.58] | 1.968 [1.72] | 2.220 [2.29] | 2.494 [2.73] | 3.213 [3.48] |
| C18:2 (Linoleic) {1.50}[C] | 1.985 [1.61] | 1.834 [1.52] | 1.680 [1.41] | 1.527 [1.38] | 1.500 [1.40] |
| C18:3 (Linolenic) | 0.079 [0.07] | 0.078 [0.07] | 0.077 [0.07] | 0.077 [0.07] | 0.082 [0.07] |
| C20:0 (Arachidic) | 0.019 [0.02] | 0.020 [0.02] | 0.022 [0.03] | 0.023 [0.03] | 0.026 [0.03] |
| Eicosenoic | 0.034 [0.03] | 0.031 [0.03] | 0.029 [0.03] | 0.027 [0.03] | 0.035 [0.04] |
| C22:0 (Behenic) | 0.009 [0.004] | 0.008 [0.005] | 0.007 [0.004] | 0.006 [0.006] | 0.005 [0.006] |
| C24:0 (Lignoceric) | 0.016 [0.01] | 0.014 [0.01] | 0.012 [0.01] | 0.010 [0.01] | 0.012 [0.01] |
| Nervonic | 0.005 | 0.006 | 0.007 | 0.008 | 0.011 |

[A]First number before the slash represents the percentage of corn coming from YDC while the number after the slash represents percentage of corn as HOHOC.
[B]Numbers in brackets represent actual values calculated from analyzed % relative fatty acid values and analyzed crude fat levels.
[C]Numbers in { } represent requirement specified for feed formulation purposes.

TABLE 16d

Calculated and analyzed fatty acid composition of test diets for Phase 3 (95 g/h/d)

| Fatty Acids | YDC 100% Control | HOHOC Treatments | | | |
|---|---|---|---|---|---|
| | | 75%/25%A | 50%/50% | 25%/75% | 0%/100% |
| | % of Total Fatty Acids (As Is Basis) | | | | |
| C14:0 (Myristic) | [0.70][B] | [0.61] | [0.48) | [0.45] | [0.48] |
| C16:0 (Palmitic) | 16.83[C] [18.40] | 15.49 [17.51] | 14.10 [15.16] | 12.78 [14.54] | 13.71 [14.47] |
| C16:1 (Palmitoleic) | 1.26 [1.20] | 1.08 [1.05] | 0.87 [0.90] | 0.67 [0.87] | 0.87 [0.87] |
| C18:0 (Stearic) | 6.69 [8.47] | 5.91 [7.82] | 5.11 [6.54] | 4.37 [6.14] | 5.25 [6.23] |
| C18:1 (Oleic) | 33.47 [32.86] | 38.54 [36.29] | 43.77 [44.98] | 49.12 [49.00] | 52.74 [52.56] |
| C18:2 (Linoleic) | 38.60 [33.37] | 35.91 [32.04] | 33.12 [27.64] | 30.08 [24.76] | 24.62 [21.17] |

TABLE 16d-continued

Calculated and analyzed fatty acid composition of test diets for Phase 3 (95 g/h/d)

| Fatty Acids | YDC 100% Control | HOHOC Treatments | | | |
|---|---|---|---|---|---|
| | | 75%/25%A | 50%/50% | 25%/75% | 0%/100% |
| C18:3 (Linolenic) | 1.54 [1.55] | 1.53 [1.39] | 1.52 [1.28] | 1.52 [1.25] | 1.35 [1.13] |
| C20:0 (Arachidic) | 0.37 [0.44] | 0.39 [0.48] | 0.43 [0.50] | 0.45 [0.51] | 0.43 [0.50] |
| Eicosenoic | 0.66 [0.69] | 0.61 [0.66] | 0.57 [0.62] | 0.53 [0.60] | 0.57 [0.62] |
| C22:0 (Behenic) | 0.18 [0.09] | 0.16 [0.10] | 0.14 [0.09] | 0.12[0.10] | 0.08 [0.09] |
| C24:0 (Lignoceric) | 0.31 [0.11] | 0.27 [0.14] | 0.24 [0.12] | 0.20[0.13] | 0.20 [0.11] |
| Nervonic | 0.10 | 0.12 | 0.14 | 0.16 | 0.18 |

[A]First number before the slash represents the percentage of corn coming from YDC while the number after the slash represents percentage of corn as HOHOC.
[B]Numbers in brackets represent actual analyzed values.
[C]Numbers calculated from calculated dietary fatty acid values divided by sum of calculated dietary fatty acids.

TABLE 17a

Ingredient composition of test diets for Phase 4 (100 g/h/d)

| Ingredients | YDC 100% (Control) | HOHOC Treatments | | | |
|---|---|---|---|---|---|
| | | 75%/25%A | 50%/50% | 25%/75% | 0%/100% |
| Yellow Dent Corn (%) | 65.08 | 49.31 | 33.08 | 16.63 | 0.00 |
| High Oleic HOC (%) | 0.00 | 16.43 | 33.06 | 49.91 | 66.51 |
| Soybean meal-48 (%) | 22.40 | 22.22 | 22.27 | 22.32 | 22.44 |
| An/Veg Fat (%) | 2.50 | 2.03 | 1.59 | 1.16 | 1.00 |
| Dicalcium Phosphate (%) | 1.47 | 1.44 | 1.41 | 1.37 | 1.34 |
| Limestone (%) | 7.99 | 8.01 | 8.03 | 8.05 | 8.12 |
| DL-Methionine (%) | 0.02 | 0.02 | 0.02 | 0.02 | 0.01 |
| Vitamin Premix (%) | | | 0.025 | | |
| Trace Mineral Mix (%) | | | 0.075 | | |
| Other[B] (%) | | | to 100% | | |

[A]First number before the slash represents the percentage of corn coming from YDC while the number after slash represents percentage of corn as HOHOC.
[B]Other = Choline chloride and salt added to help meet requirements for choline and sodium.

TABLE 17b

Nutrient composition (As Is Basis) of test diets for Phase 4 (100 g/h/d)

| Nutrients | YDC 100% (Control) | HOHOC Treatments | | | |
|---|---|---|---|---|---|
| | | 75%/25%A | 50%/50% | 25%/75% | 0%/100% |
| Moisture (%) | 11.56 [11.93][B] | 11.61 [11.77] | 11.65 [11.49] | 11.70 [11.37] | 11.69 [11.14] |
| Gross Energy (kcal/lb) | [1673] | [1663] | [1674] | [1665] | [1687] |
| ME (kcal/lb) {1310}[C] | 1310 | 1310 | 1310 | 1310 | 1314 |
| Crude Protein (%) {15.65} | 15.74 [15.03] | 15.65 [16.19] | 15.65 [17.24] | 15.65 [16.48] | 15.65 [16.62] |
| Crude Fat (%) | 5.29 [5.10] | 5.25 [4.98] | 5.24 [5.56] | 5.24 [4.74] | 5.48 [5.91] |
| Crude Fiber (%) | 2.09 [2.4] | 2.28 [2.3] | 2.47 [2.7] | 2.66 [2.4] | 2.84 [2.8] |
| Ash (%) | 11.30 [10.21] | 11.26 [10.86] | 11.23 [10.97] | 11.19 [11.37] | 11.20 [10.31] |
| Calcium (%) {3.46} | 3.46 [2.83] | 3.46 [3.04] | 3.46 [3.19] | 3.46 [3.20] | 3.48 [3.06] |
| Avail. Phosphorus (%) {0.36} | 0.36 | 0.36 | 0.36 | 0.36 | 0.36 |
| Total Phosphorus (%) | 0.59 [0.57] | 0.59 [0.58] | 0.59 [0.57] | 0.59 [0.58] | 0.59 [0.56] |
| Phytate Phosphorus (%) | 0.23 | 0.23 | 0.23 | 0.23 | 0.23 |
| Sodium (%) {0.17} | 0.17 | 0.17 | 0.17 | 0.17 | 0.18 |
| Arginine (%) {1.05} | 1.05 [0.87] | 1.05 [0.90] | 1.06 [0.97] | 1.07 [0.96] | 1.08 [0.98] |
| Cystine (%) | 0.33 [0.25] | 0.33 [0.23] | 0.34 [0.26] | 0.34 [0.25] | 0.34 [0.25] |
| Histidine (%) | 0.45 [0.37] | 0.45 [0.40] | 0.45 [0.42] | 0.46 [0.41] | 0.46 [0.42] |
| Isoleucine (%) | 0.68 [0.59] | 0.67 [0.62] | 0.68 [0.65] | 0.68 [0.64] | 0.68 [0.65] |
| Leucine (%) | 1.42 [1.23] | 1.42 [1.28] | 1.42 [1.35] | 1.42 [1.33] | 1.43 [1.35] |
| Lysine (%) {0.71} | 0.86 [0.72] | 0.86 [0.76] | 0.87 [0.81] | 0.87 [0.79] | 0.88 [0.81] |
| Methionine (%) | 0.34 [0.25] | 0.34 [0.25] | 0.34 [0.27] | 0.34 [0.25] | 0.34 [0.27] |

TABLE 17b-continued

Nutrient composition (As Is Basis) of test diets for Phase 4 (100 g/h/d)

| Nutrients | YDC 100% (Control) | HOHOC Treatments | | | |
|---|---|---|---|---|---|
| | | 75%/25%A | 50%/50% | 25%/75% | 0%/100% |
| {0.34} | | | | | |
| MET + CYS (%) | 0.67 [0.50] | 0.67 [0.48] | 0.68 [0.53] | 0.68 [0.50] | 0.68 [0.52] |
| {0.59} | | | | | |
| Phenylalanine (%) | 0.79 [0.69] | 0.79 [0.72] | 0.79 [0.76] | 0.79 [0.74] | 0.79 [0.76] |
| Tyrosine (%) | 0.64 [0.31] | 0.64 [0.32] | 0.64 [0.34] | 0.64 [0.34] | 0.64 [0.35] |
| Threonine (%) | 0.61 [0.56] | 0.61 [0.59] | 0.61 [0.62] | 0.61 [0.61] | 0.61 [0.63] |
| {0.60} | | | | | |
| Tryptophan (%) | 0.18 [0.16] | 0.18 [0.16] | 0.18 [0.18] | 0.18 [0.17] | 0.18 [0.19] |
| {0.15} | | | | | |
| Valine (%) | 0.79 [0.66] | 0.79 [0.69] | 0.79 [0.73] | 0.79 [0.72] | 0.79 [0.74] |

[A]First number before the slash represents the percentage of corn coming from YDC while the number after the slash represents percentage of corn as HOHOC.
[B]Numbers in brackets represent actual analyzed total values.
[C]Numbers in { } represent requirement specified for feed formulation purposes.

TABLE 17c

Calculated fatty acid composition of test diets for Phase 4 (100 g/h/d)

| Fatty Acids | YDC 100% Control | HOHOC Treatments | | | |
|---|---|---|---|---|---|
| | | 75%/25%A | 50%/50% | 25%/75% | 0%/100% |
| | % (As Is Basis) | | | | |
| C14:0 (Myristic) | [0.04][B] | [0.03] | [0.03] | [0.02] | [0.02] |
| C16:0 (Palmitic) | 0.873 [0.99] | 0.798 [0.88] | 0.731 [0.86] | 0.662 [0.61] | 0.655 [0.74] |
| C16:1 (Palmitoleic) | 0.065 [0.07] | 0.055 [0.06] | 0.045 [0.06] | 0.035 [0.03] | 0.032 [0.04] |
| C18:0 (Stearic) | 0.346 [0.48] | 0.303 [0.40] | 0.265 [0.36] | 0.227 [0.23] | 0.221 [0.29] |
| C18:1 (Oleic) | 1.743 [1.78] | 2.002 [1.85] | 2.279 [2.46] | 2.561 [2.38] | 2.952 [3.21] |
| C18:2 (Linoleic) | 2.026 [1.50] | 1.871 [1.52] | 1.715 [1.55] | 1.557 [1.26] | 1.427 [1.37] |
| {1.42}[C] | | | | | |
| C18:3 (Linolenic) | 0.078 [0.07] | 0.077 [0.07] | 0.077 [0.08] | 0.077 [0.07] | 0.078 [0.08] |
| C20:0 (Arachidic) | 0.020 [0.02] | 0.021 [0.02] | 0.022 [0.03] | 0.024 [0.03] | 0.025 [0.03] |
| Eicosenoic | 0.034 [0.04] | 0.032 [0.03] | 0.030 [0.03] | 0.028 [0.03] | 0.028 [0.03] |
| C22:0 (Behenic) | 0.009 [0.004] | 0.008 [0.004] | 0.006 [0.005] | 0.006 [0.005] | 0.005 [0.01] |
| C24:0 (Lignoceric) | 0.016 [0.01] | 0.014 [0.005] | 0.012 [0.01] | 0.011 [0.01] | 0.010 [0.01] |
| Nervonic | 0.005 | 0.006 | 0.007 | 0.008 | 0.010 |

[A]First number before the slash represents the percentage of corn coming from YDC while the number after the slash represents percentage of corn as HOHOC.
[B]Numbers in brackets represent actual levels calculated from analyzed % relative fatty acid values and analyzed crude fat level for the diet.
[C]Numbers in { } represent requirement specified for feed formulation purposes.

TABLE 17d

Calculated and analyzed fatty acid composition of test diets for Phase 4 (100 g/h/d)

| Fatty Acids | YDC 100% Control | HOHOC Treatments | | | |
|---|---|---|---|---|---|
| | | 75%/25%A | 50%/50% | 25%/75% | 0%/100% |
| | % of Total Fatty Acids (As Is Basis) | | | | |
| C14:0 (Myristic) | [0.78][B] | [0.68] | [0.53] | [0.34] | [0.35] |
| C16:0 (Palmitic) | 16.74[C] [19.34] | 15.38 [17.68] | 14.09 [15.44] | 12.74 [12.93] | 12.03 [12.60] |
| C16:1 (Palmitoleic) | 1.25 [1.45] | 1.06 [1.17] | 0.87 [1.01] | 0.67 [0.68] | 0.59 [0.71] |
| C18:0 (Stearic) | 6.63 [9.36] | 5.84 [8.06] | 5.11 [6.45] | 4.37 [4.95] | 4.06 [4.91] |
| C18:1 (Oleic) | 33.42 [34.92] | 38.60 [37.09] | 43.92 [44.26] | 49.29 [50.30] | 54.23 [54.27] |
| C18:2 (Linoleic) | 38.85 [29.36] | 36.07 [30.51] | 33.05 [27.84] | 29.97 [26.61] | 26.22 [23.11] |
| C18:3 (Linolenic) | 1.50 [1.32] | 1.48 [1.45] | 1.48 [1.46] | 1.48 [1.44] | 1.43 [1.31] |
| C20:0 (Arachidic) | 0.38 [0.43] | 0.40 [0.45] | 0.42 [0.47] | 0.46 [0.53] | 0.46 [0.53] |
| Eicosenoic | 0.65 [0.72] | 0.62 [0.68] | 0.58 [0.61] | 0.54 [0.56] | 0.51 [0.57] |
| C22:0 (Behenic) | 0.17 [0.07] | 0.15 [0.08] | 0.12 [0.10] | 0.12 [0.10] | 0.09 [0.10] |
| C24:0 (Lignoceric) | 0.31 [0.11] | 0.27 [0.10] | 0.24 [0.10] | 0.21 [0.11] | 0.18 [0.10] |
| Nervonic | 0.10 | 0.12 | 0.13 | 0.15 | 0.18 |

[A]First number before the slash represents the percentage of corn coming from YDC while the number after the slash represents percentage of corn as HOHOC.

TABLE 17d-continued

Calculated and analyzed fatty acid composition of test diets for Phase 4 (100 g/h/d)

| Fatty Acids | YDC 100% Control | HOHOC Treatments | | | |
|---|---|---|---|---|---|
| | | 75%/25%A | 50%/50% | 25%/75% | 0%/100% |

% of Total Fatty Acids (As Is Basis)

[B]Numbers in brackets represent actual analyzed values.
[C]Numbers calculated from calculated dietary fatty acid levels divided by sum of these fatty acids.

TABLE 18a

Ingredient composition of test diets for Phase 5 (102 g/h/d)

| Ingredients | YDC 100% (Control) | HOHOC Treatments | | | |
|---|---|---|---|---|---|
| | | 75%/25%A | 50%/50% | 25%/75% | 0%/100% |
| Yellow Dent Corn (%) | 68.05 | 51.34 | 34.44 | 17.32 | 0.00 |
| High Oleic HOC (%) | 0.00 | 17.12 | 34.44 | 51.98 | 68.95 |
| Soybean meal-48 (%) | 20.18 | 20.24 | 20.29 | 20.34 | 20.69 |
| An/Veg Fat (%) | 1.94 | 1.50 | 1.05 | 0.59 | 0.50 |
| Dicalcium Phosphate (%) | 1.44 | 1.41 | 1.38 | 1.34 | 1.31 |
| Limestone (%) | 7.83 | 7.85 | 7.88 | 7.90 | 7.97 |
| DL-Methionine (%) | 0.001 | 0.00 | 0.00 | 0.00 | 0.00 |
| L-Threonine (%) | 0.01 | 0.01 | 0.001 | 0.00 | 0.00 |
| Vitamin Premix (%) | | | 0.025 | | |
| Trace Mineral Mix (%) | | | 0.075 | | |
| Other[B] (%) | | | to 100% | | |

[A]First number before the slash represents the percentage of corn coming from YDC while the number after the slash represents percentage of corn as HOHOC.
[B]Other = Choline chloride and salt added to help meet requirements for choline and sodium.

TABLE 18b

Nutrient composition (As Is Basis) of test diets for Phase 5 (102 g/h/d)

| Nutrients | YDC 100% (Control) | HOHOC Treatments | | | |
|---|---|---|---|---|---|
| | | 75%/25%A | 50%/50% | 25%/75% | 0%/100% |
| Moisture (%) | 11.71 [12.08][B] | 11.75 [11.10] | 11.80 [11.15] | 11.84 [11.57] | 11.82 [11.23] |
| ME (kcal/lb) {1310}[C] | 1310 | 1310 | 1310 | 1310 | 1315 |
| Crude Protein (%) {14.90} | 14.90 [19.84] | 14.90 [19.36] | 14.90 [19.64] | 14.90 [16.96] | 14.99 [19.54] |
| Crude Fat (%) | 4.83 [5.31] | 4.83 [5.30] | 4.82 [5.35] | 4.81 [5.96] | 5.13 [5.49] |
| Crude Fiber (%) | 2.07 [2.2] | 2.27 [2.1] | 2.47 [2.3] | 2.67 [2.4] | 2.86 [2.5] |
| Ash (%) | 11.05 [12.36] | 11.01 [14.59] | 10.97 [12.65] | 10.94 [13.94] | 10.96 [12.05] |
| Calcium (%) {3.39} | 3.39 [3.46] | 3.39 [4.25] | 3.39 [3.70] | 3.39 [4.14] | 3.41 [3.45] |
| Avail. Phosphorus (%) {0.35} | 0.35 | 0.35 | 0.35 | 0.35 | 0.35 |
| Total Phosphorus (%) | 0.58 [0.74] | 0.57 [0.76] | 0.57 [0.72] | 0.57 [0.67] | 0.57 [0.67] |
| Phytate Phosphorus (%) | 0.23 | 0.22 | 0.22 | 0.22 | 0.22 |
| Sodium (%) {0.17} | 0.17 | 0.17 | 0.17 | 0.17 | 0.18 |
| Arginine (%) {0.98} | 0.98 [1.20] | 0.99 [1.14] | 1.00 [ ] | 1.01 [1.03] | 1.02 [1.20] |
| Cystine (%) | 0.32 [0.28] | 0.32 [0.27] | 0.33 [0.30] | 0.33 [0.25] | 0.34 [0.27] |
| Histidine (%) | 0.43 [0.48] | 0.43 [0.46] | 0.44 [0.47] | 0.44 [0.47] | 0.44 [0.51] |
| Isoleucine (%) | 0.63 [0.82] | 0.64 [0.78] | 0.64 [0.85] | 0.64 [0.71] | 0.65 [0.80] |
| Leucine (%) | 1.36 [1.68] | 1.37 [1.59] | 1.37 [1.71] | 1.37 [1.43] | 1.38 [1.56] |
| Lysine (%) {0.70} | 0.80 [1.01] | 0.81 [0.96] | 0.81 [0.84] | 0.82 [0.93] | 0.83 [1.09] |
| Methionine (%) {0.31} | 0.31 [0.28] | 0.31 [0.26] | 0.31 [0.30] | 0.31 [0.24] | 0.31 [0.27] |
| MET + CYS (%) {0.58} | 0.63 [0.56] | 0.63 [0.53] | 0.64 [0.60] | 0.64 [0.49] | 0.65 [0.54] |
| Phenylalanine (%) | 0.75 [0.94] | 0.75 [0.89] | 0.75 [1.00] | 0.75 [0.84] | 0.76 [0.95] |
| Tyrosine (%) | 0.60 [0.43] | 0.60 [0.41] | 0.61 [0.47] | 0.61 [0.38] | 0.61 [0.42] |
| Threonine (%) {0.58} | 0.58 [0.77] | 0.58 [0.73] | 0.58 [0.85] | 0.58 [0.64] | 0.59 [0.73] |
| Tryptophan (%) | 0.16 [0.23] | 0.17 [0.21] | 0.17 [0.24] | 0.17 [0.19] | 0.17 [0.23] |

TABLE 18b-continued

Nutrient composition (As Is Basis) of test diets for Phase 5 (102 g/h/d)

| Nutrients | YDC 100% (Control) | HOHOC Treatments | | | |
|---|---|---|---|---|---|
| | | 75%/25%A | 50%/50% | 25%/75% | 0%/100% |
| {0.15} Valine (%) | 0.74 [0.90] | 0.75 [0.85] | 0.75 [0.99] | 0.76 [0.83] | 0.76 [0.94] |

[A]First number before the slash represents the percentage of corn coming from YDC while the number after the slash represents percentage of corn as HOHOC.
[B]Numbers in brackets represent actual analyzed total values.
[C]Numbers in { } represent requirement specified for feed formulation purposes.

TABLE 18c

Calculated fatty acid composition of test diets for Phase 5 (102 g/h/d)

| Fatty Acids | YDC 100% Control | HOHOC Treatments | | | |
|---|---|---|---|---|---|
| | | 75%/25%A | 50%/50% | 25%/75% | 0/100% |
| | % (As Is Basis) | | | | |
| C14:0 (Myristic) | [0.03][B] | [0.04] | [0.03] | [0.03] | [0.02] |
| C16:0 (Palmitic) | 0.757 [1.03] | 0.688 [0.98] | 0.618 [0.88] | 0.557 [0.96] | 0.555 [0.71] |
| C16:1 (Palmitoleic) | 0.052 [0.06] | 0.042 [0.07] | 0.032 [0.06] | 0.022 [0.07] | 0.020 [0.04] |
| C18:0 (Stearic) | 0.281 [0.52] | 0.242 [0.46] | 0.203 [0.37] | 0.163 [0.44] | 0.165 [0.27] |
| C18:1 (Oleic) | 1.529 [1.67] | 1.815 [1.92] | 2.105 [2.24] | 2.397 [2.79] | 2.826 [2.96] |
| C18:2 (Linoleic) {1.39}[C] | 2.007 [1.78] | 1.846 [1.64] | 1.683 [1.59] | 1.519 [1.46] | 1.390 [1.30] |
| C18:3 (Linolenic) | 0.074 [0.09] | 0.074 [0.09] | 0.073 [0.09] | 0.073 [0.08] | 0.074 [0.09] |
| C20:0 (Arachidic) | 0.019 [0.02] | 0.020 [0.02] | 0.022 [0.02] | 0.023 [0.03] | 0.025 [0.03] |
| Eicosenoic | 0.029 [0.03] | 0.027 [0.03] | 0.035 [0.03] | 0.023 [0.04] | 0.024 [0.03] |
| C22:0 (Behenic) | 0.009 | 0.008 | 0.007 | 0.006 | 0.005 |
| C24:0 (Lignoceric) | 0.015 | 0.013 | 0.011 | 0.009 | 0.008 |
| Nervonic | 0.004 | 0.005 | 0.006 | 0.008 | 0.009 |

[A]First number before the slash represents the percentage of corn coming from YDC while the number after the slash represents percentage of corn as HOHOC.
[B]Numbers in brackets represent actual levels calculated from analyzed % relative fatty acid values and analyzed crude fat levels.
[C]Numbers in { } represent requirement specified for feed formulation purposes.

TABLE 18d

Calculated and analyzed fatty acid composition of test diets for Phase 5 (102 g/h/d)

| Fatty Acids | YDC 100% Control | HOHOC Treatments | | | |
|---|---|---|---|---|---|
| | | 75%/25%A | 50%/50% | 25%/75% | 0%/100% |
| | % of Total Fatty Acids (As Is Basis) | | | | |
| C14:0 (Myristic) | [0.62][B] | [0.69] | [0.54] | [0.58] | [0.31] |
| C16:0 (Palmitic) | 15.85[C] [19.38] | 14.39 [18.57] | 12.89 [16.37] | 11.60 [16.03] | 10.89 [12.86] |
| C16:1 (Palmitoleic) | 1.09 [1.04] | 0.88 [1.23] | 0.67 [1.04] | 0.46 [1.12] | 0.39 [0.68] |
| C18:0 (Stearic) | 5.88 [9.78] | 5.06 [8.66] | 4.23 [6.87] | 3.40 [7.32] | 3.23 [4.98] |
| C18:1 (Oleic) | 32.01 [31.51] | 37.97 [36.24] | 43.90 [41.88] | 49.94 [46.84] | 55.40 [53.94] |
| C18:2 (Linoleic) | 42.02 [33.57] | 38.62 [30.91] | 35.10 [29.68] | 31.64 [24.58] | 27.25 [23.65] |
| C18:3 (Linolenic) | 1.55 [1.75] | 1.55 [1.63] | 1.52 [1.69] | 1.52 [1.33] | 1.45 [1.59] |
| C20:0 (Arachidic) | 0.40 [0.43] | 0.42 [0.37] | 0.46 [0.43] | 0.48 [0.47] | 0.49 [0.57] |
| Eicosenoic | 0.61 [0.63] | 0.56 [0.61] | 0.73 [0.58] | 0.48 [0.64] | 0.47 [0.58] |
| C22:0 (Behenic) | 0.19 | 0.17 | 0.14 | 0.13 | 0.10 |
| C24:0 (Lignoceric) | 0.31 | 0.27 | 0.23 | 0.19 | 0.16 |
| Nervonic | 0.08 | 0.10 | 0.13 | 0.17 | 0.18 |

[A]First number before the slash represents the percentage of corn coming from YDC while the number after the slash represents percentage of corn as HOHOC.
[B]Numbers in brackets represent actual analyzed values.
[C]Numbers calculated from calculated dietary fatty acid levels divided by the sum of those calculated fatty acid values.

TABLE 19a

Ingredient composition of test diets for Phase 6 (103 g/h/d)

| Ingredients | YDC 100% (Control) | HOHOC Treatments | | | |
|---|---|---|---|---|---|
| | | 75%/25%A | 50%/50% | 25%/75% | 0%/100% |
| Yellow Dent Corn (%) | 68.23 | 51.48 | 34.54 | 17.38 | 0.00 |
| High Oleic HOC (%) | 0.00 | 17.16 | 34.52 | 52.10 | 69.28 |
| Soybean meal-48 (%) | 20.15 | 20.21 | 20.26 | 20.32 | 20.61 |
| An/Veg Fat (%) | 1.88 | 1.43 | 0.98 | 0.52 | 0.39 |
| Dicalcium Phosphate (%) | 1.44 | 1.41 | 1.38 | 1.34 | 1.31 |
| Limestone (%) | 7.75 | 7.78 | 7.80 | 7.82 | 7.89 |
| DL-Methionine (%) | 0.001 | 0.00 | 0.00 | 0.00 | 0.00 |
| L-Threonine (%) | 0.01 | 0.01 | 0.002 | 0.00 | 0.00 |
| Vitamin Premix (%) | | | 0.025 | | |
| Trace Mineral Mix (%) | | | 0.075 | | |
| Other[A] (%) | | | to 100% | | |

[A]First number before the slash represents the percentage of corn coming from YDC while the number after the slash represents percentage of corn as HOHOC.
[B]Other = Choline chloride and salt added to help meet requirements for choline and sodium.

TABLE 19b

Nutrient composition of test diets for Phase 6 (103 g/h/d)

| Nutrients | YDC 100% (Control) | HOHOC Treatments | | | |
|---|---|---|---|---|---|
| | | 75%/25%A | 50%/50% | 25%/75% | 0%/100% |
| Moisture (%) | 11.73 [11.44][B] | 11.77 [11.05] | 11.82 [11.31] | 11.86 [11.85] | 11.85 [11.83] |
| Gross Energy (kcal/lb) | [1716] | [1710] | [1673] | [1717] | [1713] |
| ME (kcal/lb) {1310}[c] | 1310 | 1310 | 1310 | 1310 | 1315 |
| Crude Protein (%) {14.90} | 14.90 [14.43] | 14.90 [17.72] | 14.90 [16.04] | 14.90 [15.18] | 14.97 [15.82] |
| Crude Fat (%) | 4.78 [5.55] | 4.77 [5.55] | 4.76 [4.91] | 4.75 [3.54] | 5.03 [4.88] |
| Crude Fiber (%) | 2.08 [2.1] | 2.27 [2.4] | 2.47 [2.3] | 2.68 [2.2] | 2.87 [2.5] |
| Ash (%) | 10.97 [10.56] | 10.93 [10.5] | 10.90 [11.02] | 10.86 [9.53] | 10.88 [9.04] |
| Calcium (%) {3.36} | 3.36 [3.01] | 3.36 [2.83] | 3.36 [3.38] | 3.36 [2.46] | 3.38 [2.50] |
| Avail. Phosphorus (%) {0.35} | 0.35 | 0.35 | 0.35 | 0.35 | 0.35 |
| Total Phosphorus (%) | 0.58 [0.64] | 0.58 [0.63] | 0.58 [0.58] | 0.57 [0.55] | 0.57 [0.53] |
| Phytate Phosphorus (%) | 0.23 | 0.23 | 0.23 | 0.22 | 0.22 |
| Sodium (%) {0.17} | 0.17 | 0.17 | 0.17 | 0.17 | 0.17 |
| Arginine (%) {0.95} | 0.98 [0.87] | 0.99 [0.99] | 1.00 [0.95] | 1.01 [0.88] | 1.02 [0.82] |
| Cystine (%) | 0.32 [0.24] | 0.32 [0.26] | 0.33 [0.25] | 0.33 [0.26] | 0.34 [0.27] |
| Histidine (%) | 0.43 [0.40] | 0.43 [0.43] | 0.44 [0.42] | 0.44 [0.41] | 0.44 [0.36] |
| Isoleucine (%) | 0.63 [0.61] | 0.64 [0.66] | 0.64 [0.63] | 0.64 [0.60] | 0.65 [0.54] |
| Leucine (%) | 1.36 [1.41] | 1.37 [1.43] | 1.37 [1.38] | 1.37 [1.39] | 1.38 [1.15] |
| Lysine (%) {0.69} | 0.80 [0.70] | 0.81 [0.80] | 0.81 [0.78] | 0.82 [0.70] | 0.83 [0.67] |
| Methionine (%) {0.31} | 0.31 [0.22] | 0.31 [0.24] | 0.31 [0.23] | 0.31 [0.23] | 0.31 [0.25] |
| MET + CYS (%) {0.57} | 0.63 [0.46] | 0.63 [0.50] | 0.64 [0.48] | 0.64 [0.49] | 0.65 [0.52] |
| Phenylalanine (%) | 0.75 [0.73] | 0.75 [0.78] | 0.75 [0.75] | 0.75 [0.73] | 0.76 [0.64] |
| Tyrosine (%) | 0.60 [0.34] | 0.60 [0.36] | 0.61 [0.35] | 0.61 [0.33] | 0.61 [0.29] |
| Threonine (%) {0.58} | 0.58 [0.58] | 0.58 [0.64] | 0.58 [0.61] | 0.58 [0.58] | 0.59 [0.53] |
| Tryptophan (%) {0.15} | 0.16 [0.15] | 0.17 [0.17] | 0.17 [0.17] | 0.17 [0.16] | 0.17 [0.18] |
| Valine (%) | 0.74 [0.68] | 0.75 [0.75] | 0.75 [0.71] | 0.76 [0.69] | 0.76 [0.61] |

[A]First number before the slash represents the percentage of corn coming from YDC while the number after the slash represents percentage of corn as HOHOC.
[B]Numbers in brackets represent actual analyzed total values.
[C]Numbers in { } represent requirement specified for feed formulation purposes.

TABLE 19c

Calculated fatty acid composition of test diets for Phase 6 (103 g/h/d)

| Fatty Acids | YDC 100% Control | HOHOC Treatments | | | |
|---|---|---|---|---|---|
| | | 75%/25%A | 50%/50% | 25%/75% | 0%/100% |
| | % (As Is Basis) | | | | |
| C14:0 (Myristic) | [0.04]B | [0.04] | [0.03] | [0.01] | [0.02] |
| C16:0 (Palmitic) | 0.743 [0.97] | 0.674 [0.95] | 0.604 [0.79] | 0.533 [0.50] | 0.531 [0.64] |
| C16:1 (Palmitoleic) | 0.051 [0.07] | 0.041 [0.07] | 0.030 [0.05] | 0.020 [0.03] | 0.018 [0.03] |
| C18:0 (Stearic) | 0.274 [0.40] | 0.235 [0.39] | 0.195 [0.30] | 0.155 [0.16] | 0.152 [0.23] |
| C18:1 (Oleic) | 1.503 [1.80] | 1.790 [1.82] | 2.080 [1.48] | 2.373 [1.08] | 2.789 [2.23] |
| C18:2 (Linoleic) {1.38}C | 2.002 [1.97] | 1.841 [1.99] | 1.678 [2.00] | 1.513 [1.60] | 1.380 [1.51] |
| C18:3 (Linolenic) | 0.074 [0.09] | 0.073 [0.09] | 0.073 [0.10] | 0.072 [0.07] | 0.074 [0.08] |
| C20:0 (Arachidic) | 0.019 [0.02] | 0.020 [0.02] | 0.022 [0.02] | 0.023 [0.02] | 0.025 [0.03] |
| Eicosenoic | 0.029 [0.04] | 0.027 [0.04] | 0.025 [0.03] | 0.022 [0.02] | 0.023 [0.03] |
| C22:0 (Behenic) | 0.009 [0.004] | 0.008 [0.005] | 0.007 [0.005] | 0.006 [0.004] | 0.005 [0.01] |
| C24:0 (Lignoceric) | 0.015 [0.01] | 0.013 [0.01] | 0.011 [0.01] | 0.009 [0.01] | 0.008 [0.01] |
| Nervonic | 0.004 | 0.005 | 0.006 | 0.007 | 0.009 |

AFirst number before the slash represents the percentage of corn coming from YDC while the number after the slash represents percentage of corn as HOHOC.
BNumbers in brackets represent actual values calculated from analyzed % relative fatty acid values and analyzed crude fat levels.
CNumbers in { } represent requirement specified for feed formulation purposes.

TABLE 19d

Calculated and analyzed fatty acid composition of test diets for Phase 6 (103 g/h/d)

| Fatty Acids | YDC 100% Control | HOHOC Treatments | | | |
|---|---|---|---|---|---|
| | | 75%/25%A | 50%/50% | 25%/75% | 0%/100% |
| | % of Total Fatty Acids (As Is Basis) | | | | |
| C14:0 (Myristic) | [0.73]B | [0.72] | [0.56] | [0.38] | [0.34] |
| C16:0 (Palmitic) | 15.73C [17.51] | 14.26 [17.08] | 12.77 [16.10] | 11.26 [14.22] | 10.59 [13.08] |
| C16:1 (Palmitoleic) | 1.08 [1.35] | 0.86 [1.33] | 0.63 [1.09] | 0.42 [0.79] | 0.36 [0.68] |
| C18:0 (Stearic) | 5.80 [7.17] | 4.97 [7.10] | 4.12 [6.01] | 3.27 [4.47] | 3.03 [4.70] |
| C18:1 (Oleic) | 31.82 [32.48] | 37.87 [32.78] | 43.97 [30.19] | 50.14 [30.47] | 55.62 [45.78] |
| C18:2 (Linoleic) | 42.39 [35.50] | 38.95 [35.86] | 35.47 [40.81] | 31.97 [45.14] | 27.52 [30.91] |
| C18:3 (Linolenic) | 1.57 [1.61] | 1.54 [1.67] | 1.54 [2.00] | 1.52 [1.91] | 1.487 [1.69] |
| C20:0 (Arachidic) | 0.40 [0.39] | 0.42 [0.40] | 0.47 [0.43] | 0.49 [0.46] | 0.50 [0.52] |
| Eicosenoic | 0.61 [0.71] | 0.57 [0.70] | 0.53 [0.60] | 0.46 [0.55] | 0.46 [0.55] |
| C22:0 (Behenic) | 0.19 [0.07] | 0.17 [0.09] | 0.15 [0.10] | 0.13 [0.11] | 0.10 [0.11] |
| C24:0 (Lignoceric) | 0.31 [0.10] | 0.28 [0.10] | 0.23 [0.13] | 0.19 [0.15] | 0.16 [0.13] |
| Nervonic | 0.08 | 0.11 | 0.13 | 0.15 | 0.18 |

AFirst number before the slash represents the percentage of corn coming from YDC while the number after the slash represents percentage of corn as HOHOC.
BNumbers in brackets represent actual analyzed values.
CNumbers determined from calculated fatty acid values divided by sum of these fatty acids.

TABLE 20a

Ingredient composition of test diets for Phase 7 (104 g/h/d)

| Ingredients | YDC 100% (Control) | HOHOC Treatments | | | |
|---|---|---|---|---|---|
| | | 75%/25%A | 50%/50% | 25%/75% | 0%/100% |
| Yellow Dent Corn (%) | 69.29 | 52.29 | 35.07 | 17.65 | 0.00 |
| High Oleic HOC (%) | 0.00 | 17.42 | 35.06 | 52.91 | 70.58 |
| Soybean meal - 48 (%) | 19.35 | 19.41 | 19.46 | 19.52 | 19.64 |
| An/Veg Fat (%) | 1.68 | 1.22 | 0.77 | 0.30 | 0.13 |
| Dicalcium Phosphate (%) | 1.40 | 1.37 | 1.34 | 1.30 | 1.27 |
| Limestone (%) | 7.73 | 7.75 | 7.77 | 7.80 | 7.87 |
| DL-Methionine (%) | 0.00 | 0.00 | 0.00 | 0.00 | 0.00 |
| L-Threonine (%) | 0.01 | 0.01 | 0.004 | 0.001 | 0.00 |
| Vitamin Premix (%) | | | 0.025 | | |
| Trace Mineral Mix (%) | | | 0.075 | | |
| OtherB (%) | | | to 100% | | |

TABLE 20a-continued

Ingredient composition of test diets for Phase 7 (104 g/h/d)

| Ingredients | YDC 100% (Control) | HOHOC Treatments | | | |
|---|---|---|---|---|---|
| | | 75%/25%A | 50%/50% | 25%/75% | 0%/100% |

[A]First number before the slash represents the percentage of corn coming from YDC while the number after the slash represents percentage of corn as HOHOC.

[B]Other = Choline chloride and salt added to help meet requirements for choline and sodium.

TABLE 20b

Calculated nutrient composition (As Is Basis) of test diets for Phase 7 (104 g/h/d)

| Nutrients | YDC 100% (Control) | HOHOC Treatments | | | |
|---|---|---|---|---|---|
| | | 75%/25%A | 50%/50% | 25%/75% | 0%/100% |
| Moisture (%) | 11.78 | 11.82 | 11.87 | 11.92 | 11.91 |
| ME (kcal/lb) {1310}[B] | 1310 | 1310 | 1310 | 1310 | 1310 |
| Crude Protein (%) {14.60} | 14.60 | 14.60 | 14.60 | 14.60 | 14.60 |
| Crude Fat (%) | 4.61 | 4.61 | 4.60 | 4.59 | 4.84 |
| Crude Fiber (%) | 2.07 | 2.27 | 2.47 | 2.68 | 2.88 |
| Ash (%) | 10.88 | 10.85 | 10.81 | 10.77 | 10.78 |
| Calcium (%) {3.34} | 3.34 | 3.34 | 3.34 | 3.34 | 3.36 |
| Available Phosphorus (%) {0.34} | 0.34 | 0.34 | 0.34 | 0.34 | 0.34 |
| Total Phosphorus (%) | 0.56 | 0.56 | 0.56 | 0.56 | 0.56 |
| Phytate Phosphorus (%) | 0.22 | 0.22 | 0.22 | 0.22 | 0.22 |
| Sodium (%) {0.17} | 0.17 | 0.17 | 0.17 | 0.17 | 0.17 |
| Arginine (%) {0.93} | 0.96 | 0.97 | 0.97 | 0.98 | 0.99 |
| Cystine (%) | 0.32 | 0.32 | 0.32 | 0.32 | 0.33 |
| Histidine (%) | 0.42 | 0.42 | 0.43 | 0.43 | 0.43 |
| Isoleucine (%) | 0.62 | 0.62 | 0.62 | 0.62 | 0.63 |
| Leucine (%) | 1.34 | 1.35 | 1.35 | 1.35 | 1.35 |
| Lysine (%) {0.68} | 0.78 | 0.78 | 0.79 | 0.79 | 0.80 |
| Methionine (%) {0.30} | 0.30 | 0.30 | 0.31 | 0.31 | 0.31 |
| MET + CYS (%) {0.56} | 0.62 | 0.62 | 0.63 | 0.63 | 0.64 |
| Phenylalanine (%) | 0.73 | 0.73 | 0.73 | 0.73 | 0.74 |
| Tyrosine (%) | 0.59 | 0.59 | 0.60 | 0.60 | 0.59 |
| Threonine (%) {0.57} | 0.57 | 0.57 | 0.57 | 0.57 | 0.57 |
| Tryptophan (%) {0.14} | 0.16 | 0.16 | 0.16 | 0.16 | 0.16 |
| Valine (%) | 0.73 | 0.73 | 0.73 | 0.74 | 0.75 |

[A]First number before the slash represents the percentage of corn coming from YDC while the number after the slash represents percentage of corn as HOHOC.
[B]Numbers in { } represent requirement specified for feed formulation purposes.

TABLE 20c

Calculated fatty acid composition of test diets for Phase 7 (104 g/h/d)

| Fatty Acids | YDC 100% Control | HOHOC Treatments | | | |
|---|---|---|---|---|---|
| | | 75%/25%A | 50%/50% | 25%/75% | 0%/100% |
| | % (As Is Basis) | | | | |
| C14:0 (Myristic) | | | | | |
| C16:0 (Palmitic) | 0.702 | 0.632 | 0.560 | 0.488 | 0.478 |
| C16:1 (Palmitoleic) | 0.046 | 0.036 | 0.025 | 0.015 | 0.011 |
| C18:0 (Stearic) | 0.251 | 0.211 | 0.171 | 0.130 | 0.122 |

TABLE 20c-continued

Calculated fatty acid composition of test diets for Phase 7 (104 g/h/d)

| Fatty Acids | YDC 100% Control | HOHOC Treatments | | | |
|---|---|---|---|---|---|
| | | 75%/25%A | 50%/50% | 25%/75% | 0%/100% |
| C18:1 (Oleic) | 1.427 | 1.718 | 2.012 | 2.311 | 2.722 |
| C18:2 (Linoleic) {1.36}hu B | 1.995 | 1.832 | 1.666 | 1.498 | 1.360 |
| C18:3 (Linolenic) | 0.072 | 0.072 | 0.071 | 0.071 | 0.072 |
| C20:0 (Arachidic) | 0.019 | 0.020 | 0.022 | 0.023 | 0.025 |
| Eicosenoic | 0.027 | 0.025 | 0.023 | 0.021 | 0.021 |
| C22:0 (Behenic) | 0.009 | 0.008 | 0.007 | 0.006 | 0.005 |
| C24:0 (Lignoceric) | 0.014 | 0.012 | 0.010 | 0.008 | 0.007 |
| Nervonic | 0.004 | 0.005 | 0.006 | 0.007 | 0.009 |

AFirst number before the slash represents the percentage of corn coming from YDC while the number after the slash represents percentage of corn as HOHOC.
BNumbers in { } represent requirement specified for feed formulation purposes.

Egg yolk cholesterol content was determined on days 0, 28, 56, 84, 112, 140, 168 and 196. High density lipoprotein (HDL) and low density lipoprotein (LDL) were also determined on days 28, 112 and 196.

Total cholesterol (Table 21) measured on Days 0, 28, 56, 84, 112, 140, 168 and 196 showed significant ($P<0.05$) differences between treatment groups except on Day 0, which is expected since all hens were fed the same diet for the pre-conditioner (pre-test) phase. For days 56, 84, 112, 140, 168 and 196, egg total cholesterol levels were generally significantly highest for hens fed YDC-100% and 75%/25 diets. By increasing the level of HOHOC in diet to 75% (25%/75%) or 100% (HOHOC-100%) replacement of YDC, the egg cholesterol levels were dramatically reduced, with the lowest levels observed in eggs from hens fed the HOHOC-100% diet. Significant effects of HOHOC level on total cholesterol were observed in all phases and the average of all phases. A significant quadratic effect was observed on Day 168. Based on these findings, the greatest benefit of the invention was realized when the HOHOC comprised at least 75% of the dietary corn source, preferably 100%, and was fed for more than 56 days.

TABLE 21

Effect of corn source on egg total cholesterol content

| Treatment | | Pre-Test | Phase 1 | Phase 2 | Phase 3 | Phase 4 | Phase 5 | Phase 6 | Phase 7 | |
|---|---|---|---|---|---|---|---|---|---|---|
| YDC % | HOHOC % | Day 0 | Day 28 | Day 56 | Day 84 | Day 112 | Day 140 | Day 168 | Day 196 | MEAN |
| | | | | | | Cholesterol, g/egg | | | | |
| 100 | 0 | 0.252 | 0.236 | 0.221a | 0.211a | 0.229a | 0.204a | 0.203ab | 0.209a | 0.216a |
| 75 | 25 | 0.252 | 0.236 | 0.220a | 0.211a | 0.231a | 0.202ab | 0.206a | 0.207a | 0.216a |
| 50 | 50 | 0.250 | 0.234 | 0.218a | 0.203b | 0.223b | 0.198b | 0.201b | 0.206a | 0.212b |
| 25 | 75 | 0.249 | 0.234 | 0.211b | 0.200b | 0.218c | 0.193c | 0.192c | 0.198b | 0.207c |
| 0 | 100 | 0.252 | 0.232 | 0.204c | 0.196c | 0.217c | 0.188d | 0.187d | 0.198b | 0.203d |
| Statistical Analyses: | | | | | | | | | | |
| $r^2$ | | 0.1048 | 0.1997 | 0.6227 | 0.6183 | 0.5200 | 0.6469 | 0.6842 | 0.5099 | 0.9000 |
| Treatment | | NS | NS | <0.0001 | <0.0001 | <0.0001 | <0.0001 | <0.0001 | <0.0001 | <0.0001 |
| SEM | | 0.002 | 0.002 | 0.002 | 0.001 | 0.002 | 0.001 | 0.002 | 0.001 | 0.001 |
| Linear Effect | | NS | NS | <0.0001 | <0.0001 | <0.0001 | <0.0001 | <0.0001 | <0.0001 | <0.0001 |
| Quadratic Effect | | NS | NS | NS | NS | NS | NS | 0.0463 | NS | NS | abcd Means with the same letter within a column, are not significantly different at $P < 0.05$.
NS = Not significant if $P > 0.050$.

As shown on Table 22, high density lipoprotein values for the end of Phases 4 and 7 were significantly greater for HOHOC-100%, 25%/75% and 50%/50% when compared to the 100% YDC diet. For HDL measured at the end of Phases 4 and 7, HDL content of the eggs was highest for HOHOC-100% fed hens. As shown on Table 23, the LDL levels at the end,of Phases 4 and 7 were significantly lower in eggs from hens fed HOHOC-100%, 25%/75% and 50%/50% when compared to the 100% YDC diet. For LDL content measured at the end of Phase 7, the lowest levels came from hens fed HOHOC-100%, with the levels increasing as the percentage of HOHOC in the diet was replaced with YDC.

TABLE 22

Effect of corn source on egg yolk high density lipoprotein content

| Treatment | | Egg High Density Lipoproteins g/egg | | |
|---|---|---|---|---|
| YDC % | HOHOC % | Day 28 (Phase 1) | Day 112 (Phase 4) | Day 196 (Phase 7) |
| 100 | 0 | 0.081 | 0.076c | 0.076c |
| 75 | 25 | 0.082 | 0.074d | 0.074d |
| 50 | 50 | 0.082 | 0.082a | 0.082a |
| 25 | 75 | 0.082 | 0.080b | 0.080b |
| 0 | 100 | 0.082 | 0.083a | 0.083a |
| Statistical Analyses: | | | | |
| $r^2$ | | 0.2066 | 0.7491 | 0.7491 |
| Treatment | | NS | <0.0001 | <0.0001 |
| SEM | | 0.0006 | 0.0006 | 0.0006 | abcdMeans with the same letter within a column, are not significantly different at P < 0.05.
NS = Not significant if P > 0.05.

TABLE 23

Effect of corn source on egg yolk low density lipoprotein content

| Treatment | | Egg Low Density Lipoproteins g/egg | | |
|---|---|---|---|---|
| YDC % | HOHOC % | Day 168 (Phase 1) | Day 252 (Phase 4) | Day 336 (Phase 7) |
| 100 | 0 | 0.155 | 0.153a | 0.133a |
| 75 | 25 | 0.154 | 0.157a | 0.132a |
| 50 | 50 | 0.152 | 0.141b | 0.124b |
| 25 | 75 | 0.152 | 0.138bc | 0.118c |
| 0 | 100 | 0.150 | 0.134c | 0.115c |
| Statistical Analyses: | | | | |
| $r^2$ | | 0.2594 | 0.7054 | 0.7256 |
| Treatment | | NS | <0.0001 | <0.0001 |
| SEM | | 0.002 | 0.002 | 0.001 | abcdMeans with the same letter within a column, are not significantly different at P < 0.05.
NS = Not significant if P > 0.05.

Yolk fatty acid profiles were also measured, the results of which are shown in Table 24–27.

Measurements for total oleic fatty acid are shown in Table 24. The inclusion of HOHOC in the diet generally increased the oleic fatty acid levels, with the HOHOC 100% diet having the greatest impact on oleic fatty acid levels. Yolk oleic fatty acid level were highest from hens fed the HOHOC-100% diet, while the lowest oleic fatty acid levels in the yolk corresponded with hens fed the YDC-100% diet. At the 75%/5% level, and at each level up to 100% HOHOC, the addition of HOHOC resulted in a statistically significant increase over the YDC diet value when measured as an average across all phases.

TABLE 24

Effect of corn source on yolk oleic fatty acid profile

| Treatment | | Oleic Fatty Acid (C18:1) | | | | | | | |
|---|---|---|---|---|---|---|---|---|---|
| YDC % | HOHOC % | Phase 1 | Phase 2 | Phase 3 | Phase 4 | Phase 5 | Phase 6 | Phase 7 | Average |
| | | | | % Relative | | | | | |
| 100 | 0 | 44.7 | 42.5c | 44.5 | 45.3d | 42.2c | 41.78b | 41.0 | 43.14c |
| 75 | 25 | 45.0 | 42.7bc | 44.9 | 45.7cd | 43.7b | 42.00b | 41.1 | 43.58b |
| 50 | 50 | 44.7 | 43.2abc | 44.8 | 46.2bc | 43.7b | 41.82b | 40.8 | 43.59b |
| 25 | 75 | 44.2 | 43.6ab | 45.2 | 46.8b | 44.5ab | 42.05ab | 41.2 | 43.92b |
| 0 | 100 | 44.6 | 44.0a | 45.2 | 48.1a | 45.4a | 42.64a | 41.3 | 44.48a |
| Pooled SEM | | 0.26 | 0.37 | 0.31 | 0.31 | 0.36 | 0.22 | 0.26 | 0.129 |
| Statistical Analyses: | | | | | | | | | |
| $r^2$ | | 0.3218 | 0.4182 | 0.6435 | 0.6202 | 0.5356 | 0.3936 | 0.3138 | 0.7237 |
| Treatment | | NS | 0.0275 | NS | <0.0001 | <0.0001 | 0.0478 | NS | <0.0001 |
| Phase | | NA | NA | NA | NA | NA | NA | NA | <0.0001 |
| Trt * Phase | | NA | NA | NA | NA | NA | NA | NA | 0.0002 | abc Means with the same letter within a column, are not significantly different at P < 0.05.
NS = Not significant if P > 0.05.
NA = Not applicable.

Surprisingly, as shown in table 25, the cis isomeric form of oleic acid was affected by the high oleic feed source, with the treatments with higher levels of high oleic high oil corn generally resulting in higher levels of the cis isomer of oleic acid. Cis oleic fatty acid levels were highest from hens fed the HOHOC-100% diet, while the lowest cis oleic fatty acid levels in the yolk corresponded with hens fed the YDC-100% diet. At the 75%/25% level, and at each level up to 100% HOHOC, the addition of HOHOC resulted in a statistically significant increase in the cis oleic value over the YDC diet cis oleic value when measured as an average across all phases.

TABLE 25

Effect of corn source on yolk Cis oleic fatty acid profile

| Treatment | | Cis Oleic Fatty Acid (cis C18:1) | | | | | | |
|---|---|---|---|---|---|---|---|---|
| YDC % | HOHOC % | Phase 1 | Phase 2 | Phase 3 | Phase 4 | Phase 5 | Phase 6 | Phase 7 | Average |
| | | | | | % Relative | | | | |
| 100 | 0 | 44.4 | 42.2c | 44.3 | 45.0d | 41.8c | 41.4b | 40.8 | 42.8c |
| 75 | 25 | 44.7 | 42.4bc | 44.7 | 45.4cd | 43.3b | 41.7b | 40.8 | 43.3b |
| 50 | 50 | 44.4 | 43.0abc | 44.6 | 45.9bc | 43.3b | 41.5b | 40.5 | 43.3b |
| 25 | 75 | 43.9 | 43.3ab | 45.0 | 46.6b | 44.1ab | 41.7ab | 41.0 | 43.7b |
| 0 | 100 | 44.3 | 43.8a | 45.0 | 47.8a | 45.1a | 42.3a | 41.0 | 44.2a |
| Pooled SEM | | 0.26 | 0.37 | 0.31 | 0.31 | 0.37 | 0.22 | 0.26 | 0.13 |
| Statistical Analyses: | | | | | | | | | |
| $r^2$ | | 0.3024 | 0.4217 | 0.6405 | 0.6221 | 0.5407 | 0.3784 | 0.3166 | 0.7280 |
| Treatment | | NS | 0.0214 | NS | <0.0001 | <0.0001 | 0.0467 | NS | <0.0001 |
| Phase | | NA | NA | NA | NA | NA | NA | NA | <0.0001 |
| Trt * Phase | | NA | NA | NA | NA | NA | NA | NA | 0.0001 | abc Means with the same letter within a column, are not significantly different at P < 0.05.
NS = Not significant if P > 0.05.
NA = Not Applicable As with oleic, significant differences were also observed for the levels of linoleic fatty acid, the results of which are shown in Table 26. Significant (P<0.05) differences were observed for most phases. Yolks from hens fed HOHOC-100% and 25%/75% diets had less linoleic (C18:2) than yolks from hens fed 100% YDC, which was statistically significant when measured as an average across all phases. A quadratic effect of the effect of HOHOC on the linoleic acid level was noted for phases 4, 6 and the average of all phases.

TABLE 26

Effect of corn source on yolk linoleic fatty acid profile

| Treatment | | Linoleic Fatty Acid (C18:2) | | | | | | |
|---|---|---|---|---|---|---|---|---|
| YDC % | HOHOC % | Phase 1 | Phase 2 | Phase 3 | Phase 4 | Phase 5 | Phase 6 | Phase 7 | Average |
| | | | | | % Relative | | | | |
| 100 | 0 | 12.4 | 12.0a | 11.7 | 11.5a | 13.5a | 13.3a | 13.0 | 12.36ab |
| 75 | 25 | 12.0 | 11.9ab | 11.6 | 11.5ab | 12.9b | 13.4a | 13.6 | 12.41a |
| 50 | 50 | 12.2 | 11.6bc | 11.6 | 11.3ab | 13.0b | 13.3a | 13.2 | 12.32ab |
| 25 | 75 | 12.4 | 11.4c | 11.3 | 11.0b | 12.4c | 13.4a | 12.8 | 12.10b |
| 0 | 100 | 12.4 | 10.9d | 11.3 | 10.3c | 11.8d | 12.8b | 13.2 | 11.72c |
| Pooled SEM | | 0.19 | 0.13 | 0.13 | 0.14 | 0.15 | 0.15 | 0.19 | 0.10 |
| Statistical Analyses: | | | | | | | | | |
| $r^2$ | | 0.3423 | 0.4953 | 0.2503 | 0.5609 | 0.6454 | 0.4019 | 0.3241 | 0.6129 |
| Treatment | | NS | <0.0001 | NS | <0.0001 | <0.0001 | 0.0162 | NS | <0.0001 |
| Phase | | NA | NA | NA | NA | NA | NA | NA | <0.0001 |
| Trt * Phase | | NA | NA | NA | NA | NA | NA | NA | 0.0003 |
| Linear Effect | | NS | <0.0001 | NS | <0.0001 | <0.0001 | 0.0133 | NS | <0.0001 |
| Quadratic Effect | | NS | NS | NS | 0.0311 | NS | 0.0192 | NS | 0.0433 | abcd Means with the same letter within a column, are not significantly different at P < 0.05.
NS = Not significant if P > 0.05.
NA = Not Applicable Table 27 shows the oleic:linoleic fatty acid ratio. The oleic:linoleic ratio generally increased as the proportion of HOHOC in the diet was increased. When averaged across all phases, hens fed the HOHOC-100% diet exhibited a signifi cantly greater yolk oleic:linoleic fatty acid ratio than all other treatments. The hens fed the 25%/75% diet showed the next highest yolk oleic:linoleic fatty acid ratio. Significant quadratic effects were noted for phases 4 and 6.

TABLE 27

Effect of corn source on yolk fatty acid ratio of Oleic to Linoleic

| Treatment | | Oleic:Linoleic Ratio (C18:1:C18:2) | | | | | | | |
|---|---|---|---|---|---|---|---|---|---|
| YDC % | HOHOC % | Phase 1 | Phase 2 | Phase 3 | Phase 4 | Phase 5 | Phase 6 | Phase 7 | Average |
| | | | | | % Relative | | | | |
| 100 | 0 | 3.63 | 3.56d | 3.82 | 3.94c | 3.14d | 3.15b | 3.17 | 3.49d |
| 75 | 25 | 3.77 | 3.61cd | 3.87 | 4.00c | 3.40c | 3.14b | 3.04 | 3.54cd |
| 50 | 50 | 3.68 | 3.74bc | 3.88 | 4.09bc | 3.37c | 3.14b | 3.09 | 3.57c |
| 25 | 75 | 3.60 | 3.84b | 4.00 | 4.26b | 3.60b | 3.14b | 3.22 | 3.67b |
| 0 | 100 | 3.62 | 4.06a | 4.01 | 4.68a | 3.86a | 3.35a | 3.13 | 3.82a |
| Pooled SEM | | 0.08 | 0.06 | 0.07 | 0.07 | 0.06 | 0.05 | 0.06 | 0.03 |
| Statistical Analyses: | | | | | | | | | |
| $r^2$ | | 0.2889 | 0.5166 | 0.3754 | 0.6108 | 0.6502 | 0.4245 | 0.2915 | 0.7639 |
| Treatment | | NS | <0.0001 | NS | <0.0001 | <0.0001 | 0.0070 | NS | <0.0001 |
| Phase | | NA | NA | NA | NA | NA | NA | NA | <0.0001 |
| Trt * Phase | | NA | NA | NA | NA | NA | NA | NA | <0.0001 |
| Linear Effect | | NS | <0.0001 | 0.0180 | <0.0001 | <0.0001 | 0.0034 | NS | <0.0001 |
| Quadratic Effect | | NS | NS | NS | 0.0280 | NS | 0.0195 | NS | NS | abcd Means with the same letter within a column, are not significantly different at P < 0.05.
NS = Not significant if P > 0.05.
NA = Not Applicable.

As can be seen from the foregoing examples, the present invention can be to reduce the cholesterol content of eggs and alter the fatty acid profile of eggs. Although the present invention has been described with reference to preferred embodiments, workers skilled in the art will appreciate that changes may be made in and detail without departing from the scope and spirit of the present invention.

What is claimed is:

1. A method of decreasing the cholesterol content of an egg comprising feeding a high oleic feed source in a cholesterol decreasing amount to poultry and collecting an egg produced from said poultry.

2. The method of claim 1 wherein the high oleic feed source is a high oleic variety of corn or soybean.

3. The method of claim 2 wherein the high oleic feed source comprises part of a total feed source, and the total feed source has an oleic acid content of about 2.0% to about 7.0% when measured on an as is basis.

4. The method of claim 2 wherein the high oleic feed source is corn.

5. The method of claim 4 wherein the oleic acid content of the high oleic corn is about 3.6% to about 7.0%, when measured on a dry weight basis.

6. The method of claim 4 wherein the high oleic feed source is fed for at least 56 days.

7. The method of claim 4 wherein the high oleic feed source comprises at least 50% of the total feed source.

8. The method of claim 4 wherein the high oleic feed source comprises at least 75% of the total feed source.

9. The method of claim 4 wherein the high density lipoprotein levels in the egg are increased.

10. The method of claim 4 wherein the low density lipoprotein levels in the egg are decreased.

11. A method of increasing the oleic fatty acid content of an egg comprising feeding a high oleic feed source in an oleic fatty acid increasing amount to poultry and collecting an egg produced from said poultry, wherein the high oleic feed source is a high oleic variety of corn or soybean.

12. The method of claim 11 wherein the high oleic feed source comprises part of a total feed source, and the total feed source has an oleic acid content of about 2.0% to about 7.0% when measured on an as is basis.

13. The method of claim 11 wherein the high oleic feed source is corn.

14. The method of claim 13 wherein the oleic acid content of the high oleic corn is about 3.6% to about 7.0%, when measured on a dry weight basis.

15. The method of claim 13 wherein the high oleic feed source is fed for at least 56 days.

16. The method of claim 13 wherein the high oleic feed source comprises at least 50% of the total feed source.

17. The method of claim 13 wherein the high oleic feed source comprises at least 75% of the total feed source.

18. The method of claim 13 wherein the level of the cis isomer of oleic fatty acid in the egg is increased.

19. A method of increasing the ratio of oleic to linoleic fatty acids in an egg comprising feeding a high oleic feed source in an oleic to linoleic fatty acid ratio increasing amount to poultry and collecting an egg produced from said poultry, wherein the high oleic feed source is a high oleic variety of corn or soybean.

20. The method of claim 19 wherein the high oleic feed source comprises part of a total feed source, and the total feed source has an oleic acid content of about 2.0% to about 7.0% when measured on an as is basis.

21. The method of claim 19 wherein the high oleic feed source is corn.

22. The method of claim 21 wherein the oleic acid content of the high oleic corn is about 3.6% to about 7.0%, when measured on a dry weight basis.

23. The method of claim 21 wherein the high oleic feed source is fed for at least 56 days.

24. The method of claim 21 wherein the high oleic feed source comprises at least 50% of the total feed source.

25. The method of claim 21 wherein the high oleic feed source comprises at least 75% of the total feed source.

26. A method of decreasing the linoleic content of an egg comprising feeding a high oleic, feed source in a linoleic fatty acid decreasing amount to poultry and collecting an egg produced from said poultry, wherein the high oleic feed source is a high oleic variety of corn or soybean.

27. The method of claim 26 wherein the high oleic feed source comprises part of a total feed source, and the total feed source has a linoleic acid content of less than 1.6% when measured on an as is basis.

* * * * *